United States Patent
Xiao et al.

(10) Patent No.: US 11,949,514 B2
(45) Date of Patent: Apr. 2, 2024

(54) METHOD AND APPARATUS FOR GENERATING HYBRID AUTOMATIC REPEAT REQUEST HARQ INFORMATION

(71) Applicant: HUAWEI TECHNOLOGIES CO., LTD., Guangdong (CN)

(72) Inventors: Jiehua Xiao, Shenzhen (CN); Jinlin Peng, Shanghai (CN); Zhenfei Tang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 623 days.

(21) Appl. No.: 17/129,192

(22) Filed: Dec. 21, 2020

(65) Prior Publication Data

US 2021/0152294 A1 May 20, 2021

Related U.S. Application Data

(63) Continuation of application No. PCT/CN2019/092187, filed on Jun. 21, 2019.

(30) Foreign Application Priority Data

Jun. 22, 2018 (CN) .......................... 201810654348.0

(51) Int. Cl.
  *H04L 1/1812* (2023.01)
  *H04W 72/0453* (2023.01)
  *H04W 72/23* (2023.01)
(52) U.S. Cl.
  CPC ....... *H04L 1/1819* (2013.01); *H04W 72/0453* (2013.01); *H04W 72/23* (2023.01)

(58) Field of Classification Search
  CPC ... H04L 1/1819; H04L 1/1854; H04L 1/1671; H04L 1/1812; H04W 72/0453; H04W 72/23; H04W 28/20
  See application file for complete search history.

(56) References Cited

U.S. PATENT DOCUMENTS

| | | | |
|---|---|---|---|
| 2017/0135105 A1* | 5/2017 | Li | H04L 5/0044 |
| 2018/0092002 A1* | 3/2018 | Manolakos | H04W 72/04 |

(Continued)

FOREIGN PATENT DOCUMENTS

| | | |
|---|---|---|
| CN | 105099634 A | 11/2015 |
| CN | 107889253 A | 4/2018 |
| WO | 2018085145 A1 | 5/2018 |

OTHER PUBLICATIONS

"Report of 3GPP TSG RAN2#103 meeting, Gothenburg, Sweden"; 3GPP TSG-RAN WG2 meeting #103bis R2-1813501 (Year: 2018).*

(Continued)

*Primary Examiner* — Benjamin H Elliott, IV
(74) *Attorney, Agent, or Firm* — Fish & Richardson P.C.

(57) ABSTRACT

This application provides an example method and an example apparatus for generating hybrid automatic repeat request (HARQ) information. The method includes receiving, by a terminal device, a first message sent by a network device. The first message is used to indicate that there are a plurality of active bandwidth parts (BWPs) in a cell or that there are M BWP groups in the cell, the M BWP groups may be obtained by dividing, by the network device, N configured BWPs, any BWP group includes an active BWP, M and N are integers greater than or equal to 2, and M is less than or equal to N. The method also includes generating, by the terminal device, HARQ information based on the plurality of active BWPs or the M BWP groups.

12 Claims, 20 Drawing Sheets

(56) References Cited

U.S. PATENT DOCUMENTS

| | | | | |
|---|---|---|---|---|
| 2018/0098312 | A1* | 4/2018 | Lin | H04L 5/0044 |
| 2019/0075585 | A1* | 3/2019 | Deogun | H04W 72/23 |
| 2019/0182716 | A1* | 6/2019 | Futaki | H04W 28/20 |
| 2019/0254110 | A1* | 8/2019 | He | H04L 5/0048 |
| 2019/0261425 | A1* | 8/2019 | Park | H04L 5/0098 |
| 2019/0306841 | A1* | 10/2019 | Huang | H04L 5/0055 |
| 2021/0136697 | A1* | 5/2021 | Fu | H04W 80/08 |
| 2021/0152294 | A1* | 5/2021 | Xiao | H04W 72/23 |

OTHER PUBLICATIONS

"Discussion on the addition of serving cell and bwp-Id to references to NZP-CSI-RS-Resource"; 3GPP TSG-RAN WG2 #102 R2-1807989 Busan, Korea, May 21-25, 2018; Huawei (Year: 2018).*

"Multiple active bandwidth parts"; 3GPP TSG-RAN WG2 NR #102 Meeting R2-1808650 Busan, Korea, May 21-25, 2018; Samsung (Year: 2018).*

"Addition of serving cell ID and BWP Id in references to NZP-CSI-RS-Resource"; 3GPP TSG-RAN WG2 Meeting #102 R2-1807990 Busan, Korea, May 21-25, 2018; Huawei (Year: 2018).*

"Aspects of BWP switching operation"; 3GPP TSG RAN WG4 Meeting #86Bis R4-1804218 Melbourne, Australia, Apr. 16-20, 2018; Huawei (Year: 2018).*

"Interruption Requirements on NR Serving Cells due to BWP Reconfiguration"; 3GPP TSG-RAN4 Meeting #86bis R4-1805036 Melbourne, Australia, Apr. 16-20, 2018; Ericsson (Year: 2018).*

Jeon, Intel Corporation, "NR Wide Bandwidth Operations," IEEE Communications Magazine on Key Technologies for 5G New Radio, Dec. 18, 2017, 11 pages.

Extended European Search Report issued in European Application No. 19823657.2 dated Jun. 21, 2021, 8 pages.

3GPP TS 38.213 V15.1.0 (Mar. 2018), "3rd Generation Partnership Project; Technical Specification Group Radio Access Network; NR; Physical layer procedures for control (Release 15)," Mar. 2018, 77 pages.

3GPP TS 38.211 V15.1.0 (Mar. 2018), "3rd Generation Partnership Project; Technical Specification Group Radio Access Network; NR; Physical channels and modulation (Release 15)," Mar. 2018, 90 pages.

3GPP TS 38.321 V15.2.0 (Jun. 2018), "3rd Generation Partnership Project; Technical Specification Group Radio Access Network; NR; Medium Access Control (MAC) protocol specification (Release 15)," Jun. 2018, 73 pages.

3GPP TS 38.331 V15.2.1 (Jun. 2018), "3rd Generation Partnership Project; Technical Specification Group Radio Access Network; NR; Radio Resource Control (RRC) protocol specification (Release 15)," Jun. 2018, 303 pages.

Office Action in Chinese Application No. 201810654348.0, dated Apr. 24, 2020, 4 pages.

Search Report in Chinese Application No. 201810654348.0, dated Apr. 16, 2020, 2 pages.

Office Action in Chinese Application No. 201810654348.0, dated Jan. 4, 2021, 5 pages.

Search Report in Chinese Application No. 201810654348.0, dated Dec. 26, 2020, 2 pages.

International Search Report and Written Opinion in International Application No. PCT/CN2019/092187, dated Sep. 12, 2019, 15 pages.

* cited by examiner

METHOD AND APPARATUS FOR GENERATING HYBRID AUTOMATIC REPEAT REQUEST HARQ INFORMATION

CROSS-REFERENCE TO RELATED APPLICATIONS

This application is a continuation of International Application No. PCT/CN2019/092187, filed on Jun. 21, 2019, which claims priority to Chinese Patent Application No. 201810654348.0, filed on Jun. 22, 2018. The disclosures of the aforementioned applications are hereby incorporated by reference in their entireties.

TECHNICAL FIELD

This application relates to the communications field, and more specifically, to a method and an apparatus for generating hybrid automatic repeat request HARQ information.

BACKGROUND

In a current communications system, after receiving data sent by a transmit end, a receive end needs to send, to the transmit end, hybrid automatic repeat request (hybrid auto-matic repeat request, HARQ) feedback information determined based on a decoding result. When the receive end fails to perform decoding, the transmit end needs to retransmit the data based on the HARQ feedback information.

With evolution of technologies, a concept of a bandwidth part (bandwidth part, BWP) is introduced. A BWP is a group of contiguous resource block (resource block, RB) resources on a carrier. Different BWPs may occupy frequency domain resources that partially overlap but have different bandwidths, or may occupy frequency domain resources that do not overlap in frequency domain. In this case, after the BWP is introduced, a retransmission mechanism urgently needs to be updated.

SUMMARY

This application provides a method and an apparatus for generating hybrid automatic repeat request HARQ information, so that when a serving cell is extended and includes a plurality of active bandwidth parts, and the plurality of active bandwidth parts may be located on a same carrier in the cell, or may be located on different carriers in the cell, a manner of generating a HARQ codebook can be provided.

According to a first aspect, a method for generating hybrid automatic repeat request HARQ information is provided. The method includes: receiving, by a terminal device, a first message sent by a network device, where the first message is used to indicate that there are a plurality of active bandwidth parts BWPs in a cell or that there are M BWP groups in a cell, the M BWP groups include N BWPs, the BWP group includes an active BWP, M and N are integers greater than or equal to 2, and M≤N; and generating, by the terminal device, HARQ information based on the first message.

According to the foregoing technical solution, there may be a plurality of active BWPs in a serving cell (for example, a first cell). When the network device configures a plurality of active BWPs for the terminal device, the network device may send, to the terminal device, information indicating the plurality of active BWPs, and then the terminal device generates HARQ information based on the plurality of active BWPs. Alternatively, when the network device configures a plurality of active BWPs for the terminal device, the network device may group the plurality of active BWPs into M BWP groups. Any one of the M BWP groups includes one active BWP. For example, each of the M BWP groups includes one active BWP. Alternatively, a part of the M BWP groups each include one active BWP, a part of the M BWP groups each include no active BWP, a part of the M BWP groups each include a plurality of active BWPs, or the like. The network device sends, to the terminal device, information indicating the M BWP groups, and then the terminal device generates HARQ information based on the M BWP groups. Therefore, the terminal device may generate the HARQ information based on information indicating the BWP group or information indicating the plurality of active BWPs.

With reference to the first aspect, in some implementations of the first aspect, when the first message is used to indicate that there are a plurality of active BWPs in a cell, the first message is specifically used to indicate a plurality of identifiers IDs corresponding to the plurality of active BWPs; and the generating, by the terminal device, HARQ information based on the first message includes: determining, by the terminal device based on the ID of the active BWP, a physical downlink shared channel PDSCH receiving occasion set corresponding to the active BWP; and generating, by the terminal device, first HARQ information based on the PDSCH receiving occasion set corresponding to the active BWP.

According to the foregoing technical solution, the active BWP may be indicated by using the ID, and the terminal device may determine, based on the ID of the active BWP (for example, based on a sequence of the ID of the active BWP, a type of a service carried in the active BWP, or a predefined sequence), the physical downlink shared channel receiving occasion set corresponding to the active BWP, to generate the HARQ information (for example, the first HARQ information) based on the physical downlink shared channel receiving occasion set, where the HARQ information is a semi-static HARQ codebook.

With reference to the first aspect, in some implementations of the first aspect, when the first message is used to indicate that there are M BWP groups in a cell, the first message is specifically used to indicate a plurality of identifiers IDs corresponding to the M BWP groups; and the generating, by the terminal device, HARQ information based on the first message includes: determining, by the terminal device based on the ID of the BWP group, a PDSCH receiving occasion set corresponding to the active BWP in the BWP group, where the BWP group includes one active BWP; and generating, by the terminal device, second HARQ information based on the PDSCH receiving occasion set corresponding to the active BWP in the BWP group.

According to the foregoing technical solution, the BWP group may be indicated by using the ID, and the terminal device may determine, based on the ID of the BWP group (for example, based on a sequence of the ID of the BWP group, a type of a service carried in the BWP group, or a predefined sequence), the physical downlink shared channel receiving occasion set corresponding to the active BWP in the BWP group, to generate the HARQ information (for example, the second HARQ information) based on the physical downlink shared channel receiving occasion set, where the HARQ information is a semi-static HARQ codebook.

With reference to the first aspect, in some implementations of the first aspect, the terminal device receives a second message sent by the network device, where the second message is used to indicate at least one of the following: a quantity of codewords CWs of the active BWP in the BWP group, a quantity of code block groups CBGs of the active BWP in the BWP group, and HARQ information spatial bundling indication information; and the terminal device determines a quantity of bits of the second HARQ information based on the second message.

With reference to the first aspect, in some implementations of the first aspect, the terminal device determines the quantity of bits of the second HARQ information based on a maximum value of the quantity of the CWs or a maximum value of the quantity of the CBGs.

According to the foregoing technical solution, when the network device sends, to the terminal device, the information indicating the BWP group, a quantity of bits of the HARQ information corresponding to the BWP group may be determined based on a maximum value of a quantity of codewords or code block groups of all BWPs in the BWP group.

With reference to the first aspect, in some implementations of the first aspect, when the first message is used to indicate that there are a plurality of active BWPs in a cell, the first message is specifically used to indicate a plurality of identifiers IDs corresponding to the plurality of active BWPs; the method further includes: receiving, by the terminal device, a third message sent by the network device, where the third message includes information about a first counter downlink assignment index C-DAI, and the first C-DAI is determined based on the cell, the ID of the active BWP, and a physical downlink control channel PDCCH monitoring occasion; and the generating, by the terminal device. HARQ information based on the first message includes: generating, by the terminal device, third HARQ information based on the information about the first C-DAI.

According to the foregoing technical solution, the network device sends, to the terminal device, information indicating a C-DAI, where the C-DAI may be determined by the network device based on an ID of the cell, the ID of the active BWP, and the physical downlink control channel monitoring occasion. After receiving the C-DAI, the terminal device may generate the HARQ information (for example, the third HARQ information) based on the C-DAI, where the HARQ information is a dynamic HARQ codebook.

With reference to the first aspect, in some implementations of the first aspect, when the first message is used to indicate that there are M BWP groups in a cell, the first message is specifically used to indicate a plurality of identifiers IDs corresponding to the M BWP groups; the method further includes: receiving, by the terminal device, a fourth message sent by the network device, where the fourth message includes information about a second C-DAI, and the second C-DAI is determined based on the cell, the ID of the BWP group, and a PDCCH monitoring occasion; and the generating, by the terminal device, HARQ information based on the first message includes: generating, by the terminal device, fourth HARQ information based on the information about the second C-DAI.

According to the foregoing technical solution, the network device sends, to the terminal device, information indicating a C-DAI, where the C-DAI may alternatively be determined by the network device based on an ID of the cell, the ID of the BWP group, and the physical downlink control channel monitoring occasion. After receiving the C-DAI, the terminal device may generate the HARQ information (for example, the fourth HARQ information) based on the C-DAI, where the HARQ information is a dynamic HARQ codebook.

With reference to the first aspect, in some implementations of the first aspect, the M BWP groups include at least one first BWP group and at least one second BWP group, and a HARQ codebook of the at least one first BWP group carrying first data and a HARQ codebook of the at least one second BWP group carrying second data are independent.

According to this embodiment of this application, when BWPs in the BWP group carry different service data, independent HARQ codebooks may be generated. The independent codebook means that a size, a sequence, and included HARQ information of the codebook are independently generated. For example, a part of BWP groups carry service data of ultra-reliable low-latency communication, and another part of BWP groups carry service data of enhanced mobile broadband. In this case, HARQ codebooks corresponding to the two parts of BWP groups may be independent codebooks, to be specific, the part of BWP groups correspond to one HARQ codebook, and the another part of BWP groups correspond to another HARQ codebook.

According to a second aspect, a method for generating hybrid automatic repeat request HARQ information is provided. The method includes: sending, by a network device, a first message to a terminal device, where the first message is used to indicate that there are a plurality of active bandwidth parts BWPs in a cell or that there are M BWP groups in a cell, the M BWP groups include N BWPs, the BWP group includes an active BWP, M and N are integers greater than or equal to 2, and M≤N; and receiving, by the network device. HARQ information sent by the terminal device.

According to the foregoing technical solution, there may be a plurality of active BWPs in a serving cell (for example, a first cell). When the network device configures a plurality of active BWPs for the terminal device, the network device may send, to the terminal device, information indicating the plurality of active BWPs, and then the terminal device generates HARQ information based on the plurality of active BWPs. Alternatively, when the network device configures a plurality of active BWPs for the terminal device, the network device may group the plurality of active BWPs into M BWP groups. Any one of the M BWP groups includes one active BWP. For example, each of the M BWP groups includes one active BWP. Alternatively, a part of the M BWP groups each include one active BWP, a part of the M BWP groups each include no active BWP, a part of the M BWP groups each include a plurality of active BWPs, or the like. The network device sends, to the terminal device, information indicating the M BWP groups, and then the terminal device may generate HARQ information based on the M BWP groups.

With reference to the second aspect, in some implementations of the second aspect, when the first message is used to indicate that there are a plurality of active BWPs in a cell, the first message is specifically used to indicate a plurality of identifiers IDs corresponding to the plurality of active BWPs; and the receiving, by the network device, HARQ information sent by the terminal device includes: receiving, by the network device, first HARQ information sent by the terminal device, where the first HARQ information is generated by the terminal device based on a physical downlink shared channel PDSCH receiving occasion set corresponding to the active BWP, and the PDSCH receiving occasion set corresponding to the active BWP is determined by the terminal device based on the ID of the active BWP.

According to the foregoing technical solution, the active BWP may be indicated by using the ID, and the HARQ information (for example, the first HARQ information) received by the network device may be generated by the terminal device based on the physical downlink shared channel receiving occasion set after the terminal device determines, based on the ID of the active BWP (for example, based on a sequence of the ID of the active BWP, a type of a service carried in the active BWP, or a predefined sequence), the physical downlink shared channel receiving occasion set corresponding to the active BWP.

With reference to the second aspect, in some implementations of the second aspect, when the first message is used to indicate that there are M BWP groups in a cell, the first message is specifically used to indicate a plurality of identifiers IDs corresponding to the M BWP groups; and the receiving, by the network device, HARQ information sent by the terminal device includes: receiving, by the network device, second HARQ information sent by the terminal device, where the second HARQ information is generated by the terminal device based on a PDSCH receiving occasion set corresponding to the active BWP in the BWP group, the PDSCH receiving occasion set corresponding to the active BWP in the BWP group is determined by the terminal device based on the ID of the BWP group, and the BWP group includes one active BWP.

According to the foregoing technical solution, the BWP group may be indicated by using the ID, and the HARQ information (for example, the second HARQ information) received by the network device may be generated by the terminal device based on the physical downlink shared channel receiving occasion set after the terminal device determines, based on the ID of the BWP group (for example, based on a sequence of the ID of the BWP group, a type of a service carried in the BWP group, or a predefined sequence), the physical downlink shared channel receiving occasion set corresponding to the active BWP in the BWP group.

With reference to the second aspect, in some implementations of the second aspect, the network device sends a second message to the terminal device, where the second message is used to indicate at least one of the following: a quantity of codewords CWs of the active BWP in the BWP group, a quantity of code block groups CBGs of the active BWP in the BWP group, and HARQ information spatial bundling indication information.

With reference to the second aspect, in some implementations of the second aspect, a quantity of bits of the second HARQ information is determined by the terminal device based on a maximum value of the quantity of the CWs or a maximum value of the quantity of the CBGs.

According to the foregoing technical solution, when the network device sends, to the terminal device, the information indicating the BWP group, a quantity of bits of the HARQ information corresponding to the BWP group may be determined based on a maximum value of a quantity of codewords or code block groups of all BWPs in the BWP group.

With reference to the second aspect, in some implementations of the second aspect, when the first message is used to indicate that there are a plurality of active BWPs in a cell, the first message is specifically used to indicate a plurality of identifiers IDs corresponding to the plurality of active BWPs; and the method further includes: determining, by the network device, a first counter downlink assignment index C-DAI based on the cell, the ID of the active BWP, and a physical downlink control channel PDCCH monitoring occasion; and sending, by the network device, a third message to the terminal device, where the third message includes information about the first C-DAI.

According to the foregoing technical solution, the network device sends, to the terminal device, information indicating a C-DAI, where the C-DAI may be determined by the network device based on an ID of the cell, the ID of the active BWP, and the physical downlink control channel monitoring occasion.

With reference to the second aspect, in some implementations of the second aspect, when the first message is used to indicate that there are M BWP groups in a cell, the first message is specifically used to indicate a plurality of identifiers IDs corresponding to the M BWP groups; and the method further includes: determining, by the network device, a second counter downlink assignment index C-DAI based on the cell, the ID of the BWP group, and a physical downlink control channel PDCCH monitoring occasion; and sending, by the network device, a fourth message to the terminal device, where the fourth message includes information about the second C-DAI.

According to the foregoing technical solution, the network device sends, to the terminal device, information indicating a C-DAI, where the C-DAI may alternatively be determined by the network device based on an ID of the cell, the ID of the BWP group, and the physical downlink control channel monitoring occasion.

With reference to the second aspect, in some implementations of the second aspect, the M BWP groups include at least one first BWP group and at least one second BWP group, and a HARQ codebook of the at least one first BWP group carrying first data and a HARQ codebook of the at least one second BWP group carrying second data are independent.

According to this embodiment of this application, when BWPs in the BWP group carry different service data, independent HARQ codebooks may be generated. For example, a part of BWP groups carry service data of ultra-reliable low-latency communication, and another part of BWP groups carry service data of enhanced mobile broadband. In this case, HARQ codebooks corresponding to the two parts of BWP groups may be independent codebooks, to be specific, the part of BWP groups correspond to one HARQ codebook, and the another part of BWP groups correspond to another HARQ codebook.

According to a third aspect, a terminal device is provided. The terminal device has functions of implementing the terminal device in the foregoing method designs in the first aspect. The functions may be implemented by hardware, or may be implemented by hardware executing corresponding software. The hardware or the software includes one or more units corresponding to the foregoing functions.

According to a fourth aspect, a network device is provided. The network device has functions of implementing the network device in the method designs in the second aspect. The functions may be implemented by hardware, or may be implemented by hardware executing corresponding software. The hardware or the software includes one or more units corresponding to the foregoing functions.

According to a fifth aspect, a terminal device is provided. The terminal device includes a transceiver, a processor, and a memory. The processor is configured to control the transceiver to send and receive information. The memory is configured to store a computer program. The processor is configured to invoke the computer program from the memory and run the computer program, so that the terminal device performs the method according to any one of the first aspect and the possible implementations of the first aspect.

According to a sixth aspect, a network device is provided. The network device includes a transceiver, a processor, and a memory. The processor is configured to control the transceiver to send and receive information. The memory is configured to store a computer program. The processor is configured to invoke the computer program from the memory and run the computer program, so that the network device performs the method according to any one of the second aspect and the possible implementations of the second aspect.

According to a seventh aspect, an apparatus is provided. The apparatus may be the terminal device in the foregoing method designs, or may be a chip disposed in the terminal device. The apparatus includes a processor, and the processor is coupled to a memory and may be configured to execute an instruction in the memory, to implement the method performed by the terminal device in any one of the first aspect and the possible implementations of the first aspect. Optionally, the apparatus further includes the memory. Optionally, the apparatus further includes a communications interface, and the processor is coupled to the communications interface.

According to an eighth aspect, an apparatus is provided. The apparatus may be the network device in the foregoing method designs, or may be a chip disposed in the network device. The apparatus includes a processor, and the processor is coupled to a memory and may be configured to execute an instruction in the memory, to implement the method performed by the network device in any one of the second aspect and the possible implementations of the second aspect. Optionally, the apparatus further includes the memory. Optionally, the apparatus further includes a communications interface, and the processor is coupled to the communications interface.

According to a ninth aspect, a communications system is provided. The communications system includes the network device and the terminal device in the foregoing method designs.

According to a tenth aspect, a computer program product is provided. The computer program product includes computer program code; and when the computer program code is run on a computer, the computer is enabled to perform the methods in the foregoing aspects.

According to an eleventh aspect, a computer-readable medium is provided. The computer-readable medium stores program code; and when the computer program code is run on a computer, the computer is enabled to perform the methods in the foregoing aspects.

According to a twelfth aspect, a chip system is provided. The chip system includes a processor, configured to support a terminal device in implementing functions in the foregoing aspects, for example, generating, receiving, sending, or processing data and/or information in the foregoing methods. In a possible design, the chip system further includes a memory, and the memory is configured to store a program instruction and data that are necessary for the terminal device. The chip system may include a chip, or may include a chip and another discrete component.

According to a thirteenth aspect, a chip system is provided. The chip system includes a processor, configured to support a network device in implementing functions in the foregoing aspects, for example, generating, receiving, sending, or processing data and/or information in the foregoing methods. In a possible design, the chip system further includes a memory, and the memory is configured to store a program instruction and data that are necessary for the network device. The chip system may include a chip, or may include a chip and another discrete component.

DETAILED DESCRIPTION OF EMBODIMENTS

The following describes technical solutions of this application with reference to the accompanying drawings.

The technical solutions of embodiments of this application may be applied to various communications systems, for example, a global system for mobile communications (global system for mobile communications, GSM) system, a code division multiple access (code division multiple access, CDMA) system, a wideband code division multiple access (wideband code division multiple access, WCDMA) system, a general packet radio service (general packet radio service, GPRS) system, a long term evolution (long term evolution, LTE) system, an LTE frequency division duplex (frequency division duplex, FDD) system, an LTE time division duplex (time division duplex, TDD) system, a universal mobile telecommunications system (universal mobile telecommunications system, UMTS), a worldwide interoperability for microwave access (worldwide interoperability for microwave access, WiMAX) communications system, and a 5th generation (5th generation, 5G) system or a new radio (new radio, NR) system. The technical solutions in the embodiments of this application may be further applied to device-to-device (device to device, D2D) communication, machine-to-machine (machine to machine, M2M) communication, machine type communication (machine type communication, MTC), and communication in an internet of vehicles system. Communication modes in the internet of vehicles system are collectively referred to as V2X (X represents everything). For example, the V2X communication includes vehicle-to-vehicle (vehicle to vehicle, V2V) communication, vehicle-to-infrastructure (vehicle to infrastructure, V2I) communication, vehicle-to-pedestrian (vehicle to pedestrian, V2P) communication, or vehicle-to-network (vehicle to network, V2N) communication.

Figure 1:
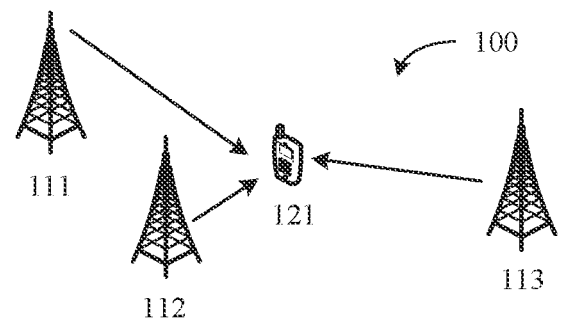
FIG. 1 is a schematic diagram of a communications system applicable to a method for generating HARQ information according to an embodiment of this application.

For ease of understanding the embodiments of this application, a communications system shown in FIG. 1 is first used as an example to describe in detail a communications system applicable to the embodiments of this application. FIG. 1 is a schematic diagram of a wireless communications system 100 applicable to an embodiment of this application. As shown in FIG. 1, the wireless communications system 100 may include one or more network devices, for example, a network device #1 111, a network device #2 112, and a network device #3 113 shown in FIG. 1. The wireless communications system 100 may further include one or more terminal devices, for example, a terminal device 121 shown in FIG. 1. The wireless communications system 100 may further support CoMP transmission. To be specific, a plurality of cells or a plurality of network devices may cooperatively participate in transmitting data to one terminal device or jointly receive data sent by one terminal device, or a plurality of cells or a plurality of network devices perform coordinated scheduling or coordinated beamforming. The plurality of cells may belong to a same network device or different network devices, and may be selected based on a channel gain, a path loss, received signal strength, a received signal instruction, or the like.

It should be understood that the network device in the system 100 may be any device that has a wireless transceiver function or a chip that can be disposed in the device. The device includes but is not limited to an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB, or a home NodeB, HNB), a donor base station (donor eNB, DeNB), a baseband unit (baseband unit, BBU), an access point (access point, AP) in a wireless fidelity (wireless fidelity, Wi-Fi) system, a wireless relay node, a wireless backhaul node, a transmission point (transmission point, TP), a transmission reception point (transmission reception point, TRP), or the like. Alternatively, the device may be a gNB or a transmission point (a TRP or a TP) in a 5G system such as an NR system; may be an antenna panel or a group of antenna panels (including a plurality of antenna panels) of a base station in a 5G system; or may be a network node, such as a baseband unit (BBU) or a distributed unit (distributed unit, DU), that constitutes a gNB or a transmission point.

In some deployments, the gNB may include a central unit (centralized unit, CU) and a DU. The gNB may further include a radio frequency unit (radio unit, RU). The CU implements some functions of the gNB, and the DU implements some functions of the gNB. For example, the CU implements functions of a radio resource control (radio resource control, RRC) layer and a packet data convergence protocol (packet data convergence protocol, PDCP) layer, and the DU implements functions of a radio link control (radio link control, RLC) layer, a media access control (media access control, MAC) layer, and a physical (physical, PHY) layer. Because information at the RRC layer finally becomes information at the PHY layer, or is converted from information at the PHY layer, in this architecture, higher layer signaling such as RRC signaling or PHCP signaling may also be considered as being sent by the DU or sent by the DU and the RU. It may be understood that the network device may be a CU node, a DU node, or a device including a CU node and a DU node. In addition, the CU may be classified as a network device in an access network RAN, or the CU may be classified as a network device in a core network CN. This is not limited herein.

It should be further understood that the terminal device in the system 100 may also be referred to as user equipment (user equipment, UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device in the embodiments of this application may be a mobile phone (mobile phone), a tablet computer (Pad), a computer with a wireless transceiver function, a virtual reality (virtual reality, VR) terminal device, an augmented reality (augmented reality, AR) terminal device, a wireless terminal in industrial control (industrial control), a wireless terminal in self driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), or the like. An application scenario is not limited in the embodiments of this application. In this application, the foregoing terminal device and a chip that can be disposed in the foregoing terminal device are collectively referred to as a terminal device.

Optionally, in the communications system 100 shown in FIG. 1, one (for example, the network device #1) of the network device #1 to the network device #3 may be a serving network device. The serving network device may be a network device that provides at least one of an RRC connection, non-access stratum (non-access stratum, NAS) mobility management, and security input for the terminal device by using a wireless air interface protocol. Optionally, the network device #2 and the network device #3 may be coordinating network devices. The serving network device may send control signaling to the terminal device, and the coordinating network device may send data to the terminal device; the serving network device may send control signaling to the terminal device, and the serving network device and the coordinating network device may send data to the terminal device; both the serving network device and the coordinating network device may send control signaling to the terminal device, and both the serving network device and the coordinating network device may send data to the terminal device; the coordinating network device may send control signaling to the terminal device, and at least one of the serving network device and the coordinating network device may send data to the terminal device; or the coordinating network device may send control signaling and data to the terminal device. This is not particularly limited in the embodiments of this application.

Optionally, in the communications system 100 shown in FIG. 1, the network device #1 to the network device #3 each may be a serving network device.

It should be understood that for ease of understanding, FIG. 1 shows, for example, only the network device #1 to the network device #3 and the terminal device. However, this should not constitute any limitation on this application. The wireless communications system may further include more or fewer network devices, and may include more terminal devices. Network devices communicating with different terminal devices may be a same network device, or may be different network devices. Quantities of network devices communicating with different terminal devices may be the same or may be different. These are not limited in this application.

A hybrid automatic repeat request (hybrid automatic repeat request, HARQ) is a technology combining a forward error correction (forward error correction, FEC) method and an automatic repeat request (automatic repeat request, ARQ) method. The FEC enables a receive end to correct some errors by adding redundant information, thereby reducing a quantity of retransmission times. The FEC is commonly referred to as redundant channel coding. For an error that the FEC cannot correct, the receive end requests a transmit end to retransmit data by using an ARQ mechanism. The receive end detects, by using an error detection code, for example, a cyclic redundancy check (cyclic redundancy check, CRC), whether an error occurs in a received data packet. If there is no error an acknowledgment (Acknowledgment, ACK) is sent, where the ACK is usually represented by "1". If there is an error, the receive end discards the data packet or saves the data packet for reference after the data is retransmitted, and sends a negative acknowledgment (Negative Acknowledgment, NACK) to the transmit end, where the NACK is usually represented by "0". After receiving the NACK, the transmit end usually retransmits the same data.

This application mainly considers a scenario in which a serving cell is extended and can include a plurality of downlink carriers, or a downlink carrier includes a plurality of active downlink bandwidth parts, and provides a method for generating a HARQ codebook. In other words, this application is mainly for a scenario in which a cell includes a plurality of active bandwidth parts, where the plurality of active bandwidth parts may be located on a same carrier or different carriers of the cell.

For ease of understanding the embodiments of this application, before the embodiments of this application are described, several nouns or terms used in this application are first briefly described.

1. Physical Downlink Control Channel

The physical downlink control channel (physical downlink control channel, PDCCH) may be used to send downlink scheduling information (DL assignment) to a terminal, so that the terminal receives a physical downlink shared channel (physical downlink shared channel, PDSCH). The PDCCH may be further used to send uplink scheduling information (UL Grant) to the terminal, so that the terminal sends a physical uplink shared channel (physical uplink shared channel, PUSCH). The PDCCH may be further used to send an aperiodic channel quality indicator (channel quality indicator, CQI) report request. The PDCCH may be further used to notify a change of a multicast control channel (multicast control channel, MCCH). The PDCCH may be further used to send an uplink power control command. The PDCCH may be further used to indicate HARQ-related information. The PDCCH may be further used to carry a radio network temporary identifier (radio network temporary identifier, RNTI), where the information is implicitly included in a cyclic redundancy check (cyclic redundancy check, CRC), and the like.

2. Downlink Control Information

Information carried on a PDCCH is referred to as downlink control information (downlink control information, DCI). The downlink DCI may be used to send downlink scheduling assignment information or uplink scheduling information. The DCI has a plurality of formats (format), and various DCI formats and specific information carried in the DCI formats vary with functions of the DC formats. For example, a format 0 in an LTE system or a format 0_0/format 0_1 in an NR system may be used to transmit PUSCH scheduling grant information. For another example, a format 1 in an LTE system or a format 0_0/format 0_1 in an NR system may be used to transmit PDSCH single-codeword scheduling grant information.

The DCI may indicate cell-level information, and may be scrambled by using a system information radio network temporary identifier (system information radio network temporary identifier, SI-RNTI), a paging radio network temporary identifier (paging radio network temporary identifier. P-RNTI), a random access radio network temporary identifier (random access radio network temporary identifier, RA-RNTI), or the like. The DCI may also indicate terminal-level information, and may be scrambled by using a cell radio network temporary identifier (cell radio network temporary identifier, C-RNTI).

One PDCCH usually carries one piece of DCI of a specific format. A cell may schedule a plurality of terminals simultaneously in an uplink and a downlink. That is, a cell may send a plurality of pieces of scheduling information in each scheduling time unit. Each piece of scheduling information is transmitted on an independent PDCCH. That is, a cell may simultaneously send a plurality of PDCCHs in one scheduling time unit.

3. Cell

The cell is described by a higher layer from a perspective of resource management, mobility management, or a service unit. Coverage of each network device may be divided into one or more serving cells, and the serving cell may be considered as including a specific frequency domain resource. In other words, a serving cell may include a carrier. Actually, in an existing LTE system or an existing NR system, one cell usually includes one downlink carrier.

Figure 2:
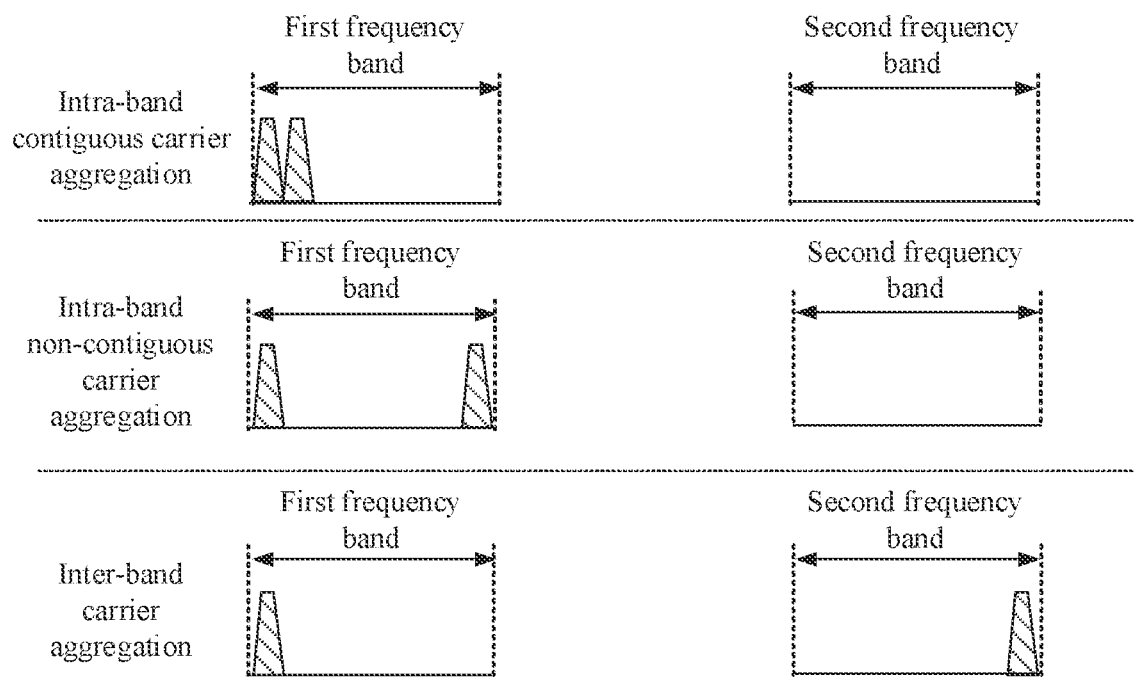
FIG. 2 is a schematic diagram of carrier aggregation applicable to an embodiment of this application.

Carrier aggregation (carrier aggregation, CA) is to aggregate two or more carriers to support a wider transmission bandwidth, as shown in FIG. 2. Existing downlink carrier aggregation is also aggregation of a plurality of cells.

A primary cell (primary cell, PCell) is a cell in which a terminal performs initial connection establishment, or a cell in which a terminal performs RRC connection reestablishment, or a primary cell designated in a handover (handover) process.

A secondary cell (secondary cell, SCell) is added during RRC reconfiguration, and is used to provide additional radio resources. A carrier corresponding to the SCell may be referred to as a secondary carrier.

A terminal that is configured with carrier aggregation may be connected to one PCell and a plurality of SCells.

4. Downlink HARQ Codebook

HARQ information is classified into downlink HARQ information and uplink HARQ information. The downlink HARQ information is HARQ information of downlink data (for example, a PDSCH), and may also be referred to as HARQ-ACK information. The uplink HARQ information is HARQ information of uplink data (for example, a PUSCH), and may also be referred to as HARQ-ACK information of the PUSCH. The embodiments of this application are mainly for the downlink HARQ information.

The downlink HARQ information is a type of uplink control information (uplink control information, UCI). The UCI may be used to carry at least one of channel state information (channel state information, CSI) (which may include, for example, one or more of a precoding matrix indicator (precoding matrix indicator. PMI), a rank indication (rank indication, RI), and a channel quality indicator (channel quality indicator, CQI)), downlink HARQ information, or an uplink scheduling request (scheduling request, SR).

Figure 3:
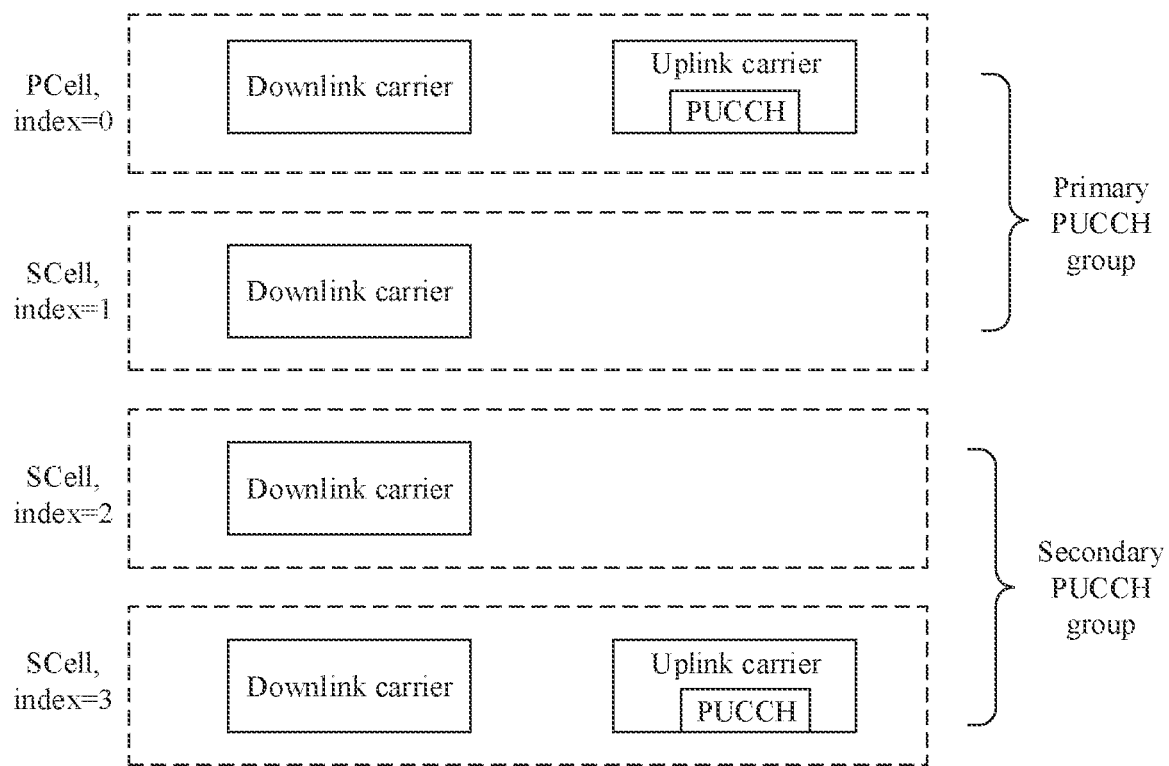
FIG. 3 is a schematic diagram of serving cells, carriers, and PUCCH groups that are applicable to an embodiment of this application.

Generally, the downlink HARQ information is sent on a physical uplink control channel (physical uplink control channel, PUCCH), or may be sent on a PUSCH when a specific condition is met. In a carrier aggregation scenario, because an uplink carrier aggregation capability on a terminal side is limited, HARQ information of downlink data on a plurality of downlink carriers is fed back on a few uplink carriers. When a terminal does not have an uplink carrier aggregation capability (that is, the terminal supports uplink single-carrier sending), HARQ-ACK information of PDSCHs on a plurality of carriers is fed back by using a PUCCH on one uplink primary carrier. When the terminal has the uplink carrier aggregation capability, downlink carriers may be grouped, and for each group of downlink carriers, HARQ-ACK information is fed back by using a PUCCH on an uplink carrier. Each group corresponds to one PUCCH. Therefore, each group may also be referred to as a PUCCH group (PUCCH group). A PUCCH group including a primary carrier may be referred to as a primary PUCCH group (primary PUCCH group), and another PUCCH group is referred to as a secondary PUCCH group (secondary PUCCH group). FIG. 3 is a schematic diagram of cells, carriers, and PUCCH groups. In FIG. 3, one PCell and three SCells are used as an example for description.

Figure 4:
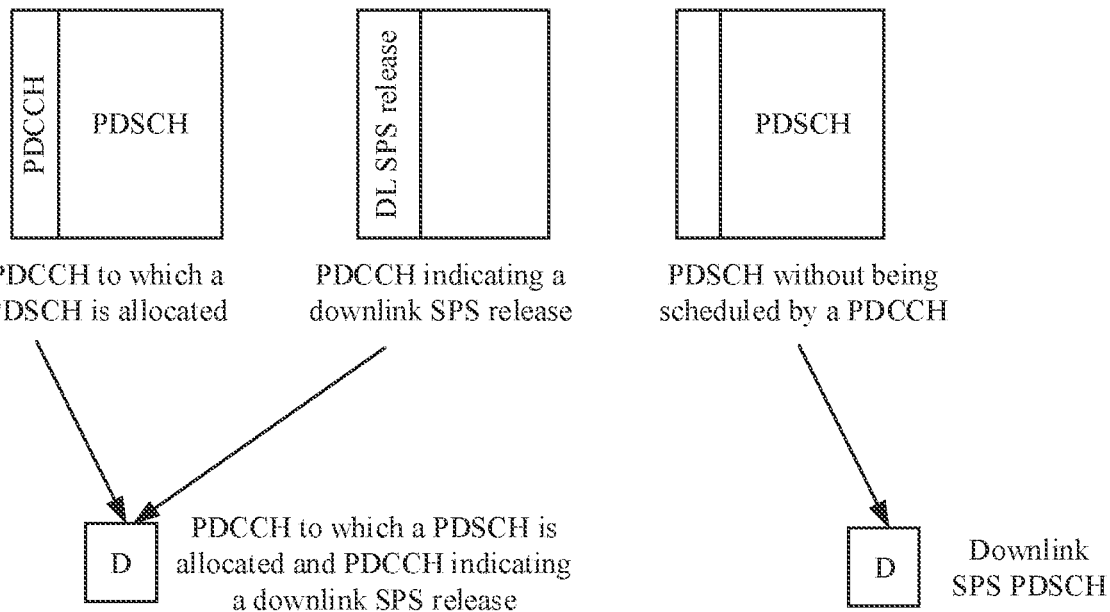
FIG. 4 is a schematic diagram of types, of downlink data that requires a HARQ feedback, applicable to an embodiment of this application.

A HARQ codebook may be understood as HARQ information bits sent on a PUCCH resource or a PUSCH resource. For example, the HARQ codebook includes a size (that is, a quantity of the HARQ information bits) of the codebook and a sequence of the HARQ information bits. FIG. 4 shows types of downlink data that requires a HARQ feedback. As shown in FIG. 4, the types of downlink data for which HARQ information needs to be fed back include: a PDSCH corresponding to a PDCCH, a semi-persistent scheduling (semi-persistent scheduling, SPS) PDSCH, and a downlink SPS release (RELEASE), which may also be referred to as an SPS PDSCH release. For brief description, the first two types of downlink data are collectively referred to as PDSCH data, and the SPS PDSCH release is used as special downlink data and is not described separately.

5. Numerology (Numerology)

The numerology may refer to a set of parameters, including a subcarrier spacing (subcarrier spacing, SCS), a symbol length, a slot length, a cyclic prefix (Cyclic Prefix, CP) length, and the like. In an NR system, a new feature is that a plurality of numerologies may be mixed and used at the same time. The numerology is defined by using the SCS and the CP. Table 1 shows a plurality of numerologies that currently can be supported in the NR system.

TABLE 1

| μ | $\Delta f = 2^\mu * 15$ (kHz) | CP |
|---|---|---|
| 0 | 15 | Normal (Normal) |
| 1 | 30 | Normal |
| 2 | 60 | Normal, extended (Extended) |
| 3 | 120 | Normal |
| 4 | 240 | Normal |

Specifically, it can be learned from Table 1 that μ may be used to represent different numerologies. It can be learned from Table 1 that at least four different numerologies, namely, μ=0, μ=1, μ=2, μ=3, and μ=4, are included. In the embodiments of this application, is denoted as μ0, μ1, μ2, μ3, and μ4 for differentiation. When μ=0, $SCS=2^\mu*15=2^0*15=15$ kHz. When μ=1, $SCS=2^\mu*15=2^1*15=30$ kHz. When μ=2, $SCS=2^\mu*15=2^2*15=60$ kHz. When μ=3, $SCS=2^\mu*15=2^3*15=120$ kHz. When μ=4, $SCS=2^\mu*15=2^4*15=240$ kHz.

6. Bandwidth Part

Figure 5:
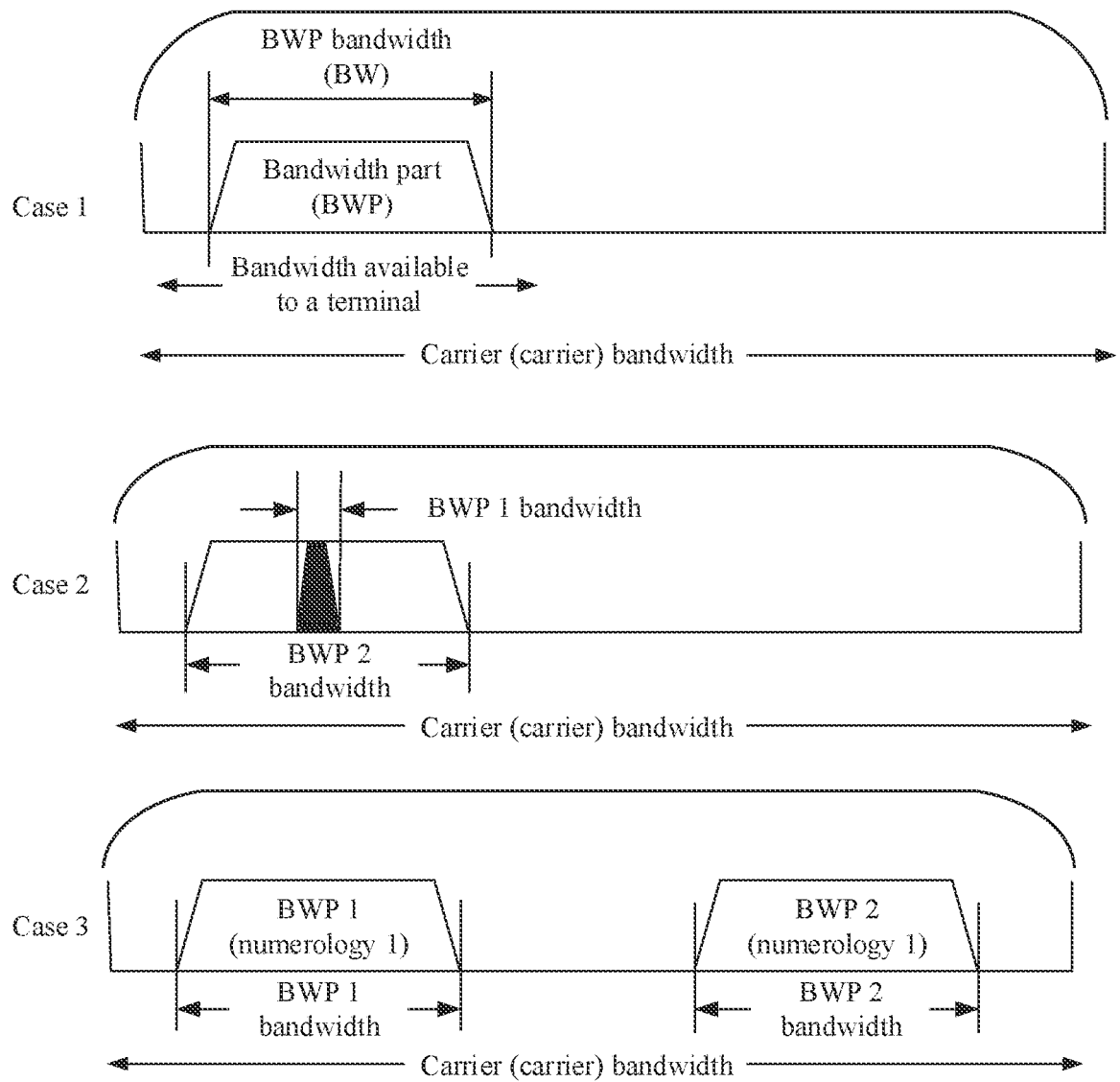
FIG. 5 is a schematic diagram of a BWP applicable to an embodiment of this application.

In an NR system, a carrier of a base station has a wider bandwidth than an LTE carrier. For example, a bandwidth of an NR carrier may be 100 M. Different terminals have different radio frequency capabilities, and can support different maximum bandwidths. Therefore, a concept of a bandwidth part (bandwidth part, BWP) is introduced. FIG. 5 is a schematic diagram of a BWP. A BWP is a group of contiguous RB resources on a carrier. Different BWPs may occupy frequency domain resources that partially overlap but have different bandwidths, or may be bandwidth resources that have different numerologies and that may not overlap with each other in frequency domain.

7. HARQ Information Spatial Bundling

The HARQ information spatial bundling means that when two transport blocks are sent in a same cell in one downlink time unit, logical "AND" processing is performed on HARQ information corresponding to the two transport blocks, to obtain 1-bit HARQ information.

In the embodiments of this application, for brief description, a DL BWP is used to represent a downlink BWP, and an UL BWP is used to represent an uplink BWP.

When a cell includes a plurality of active bandwidth parts, a plurality of configured BWPs in the cell may be grouped. The plurality of active bandwidth parts may be located on a same carrier or different carriers of the cell. In other words, when a cell can include a plurality of downlink carriers or a carrier includes a plurality of active DL BWPs, a plurality of configured BWPs in the cell may be grouped. Generally, when a base station performs BWP grouping, bandwidth positions of different BWPs may be considered, and the BWP grouping is performed based on a relationship between BWPs that are expected to support a data retransmission requirement between the BWPs. In addition, when the base station performs the BWP grouping, some special resource use situations may be considered.

Figure 6:
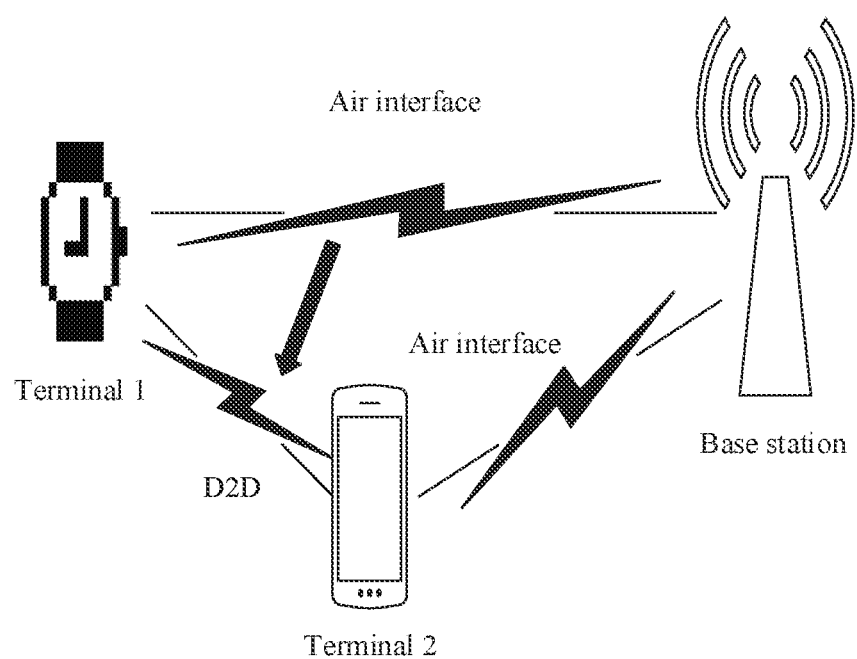
FIG. 6 is a schematic diagram of a D2D link applicable to an embodiment of this application.
Figure 7:
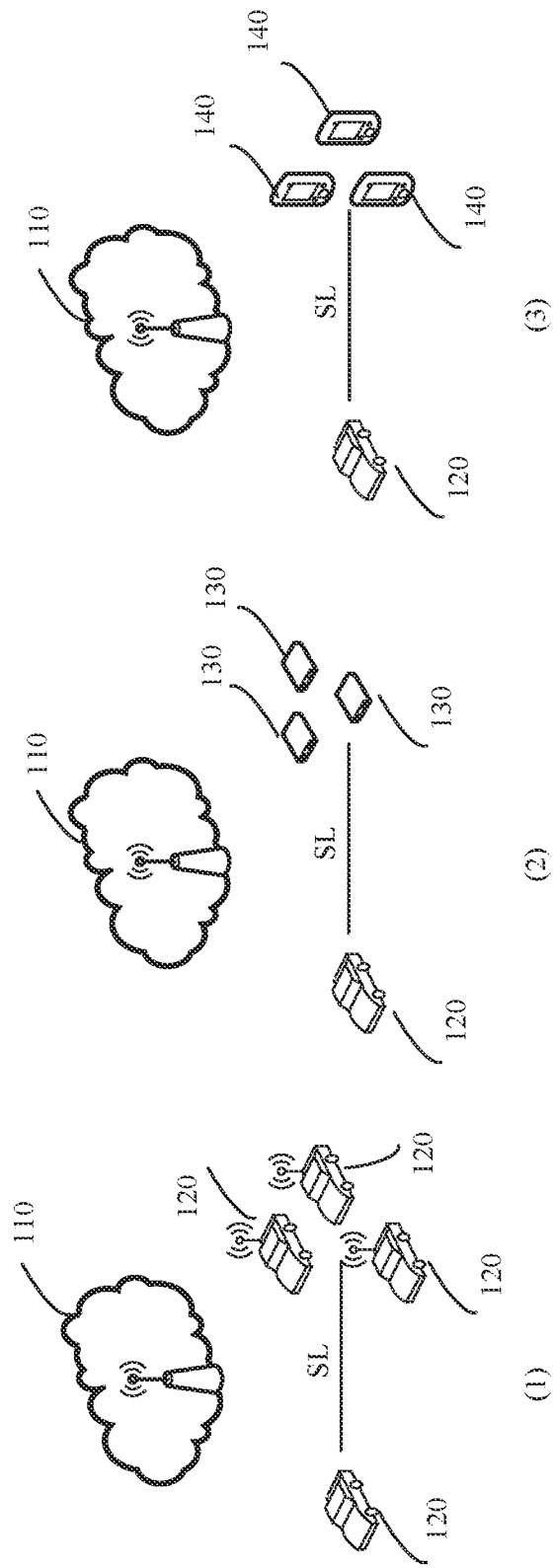
FIG. 7 is a schematic diagram of a V2X link applicable to an embodiment of this application.

In a possible manner, as shown in FIG. 6 and FIG. 7, BWPs used for data sending and receiving on a sidelink (sidelink, SL) in D2D communication or V2X communication are grouped into a separate group. The separate group may be one or more separate groups. The SL refers to a D2D link shown in FIG. 6 and an SL link shown in FIG. 7. On the SL, data transmitted between terminal devices may not be forwarded by a network device. In other words, the SL may be a transmission link between the terminal devices.

As shown in FIG. 7, a vehicle may obtain road condition information or receive an information service in time through V2V, V2I, V2P. or V2N communication. These communication modes may be collectively referred to as V2X communication. In FIG. 7, a figure (1), a figure (2), and a figure (3) are respectively schematic diagrams of V2V, V2I, and V2P communication. 110 represents a network device, and may correspond to any one or more of the network device #1 111, the network device #2 112, and the network device #3 113 in FIG. 1. For example, the network device may be an E-UTRAN. 120 may represent a vehicle, 130 may represent a roadside infrastructure, and 140 may represent a pedestrian. Most common V2V communication and V2I communication are used as an example. As shown in the figure (1) in FIG. 7, a vehicle may broadcast, to a surrounding vehicle through the V2V communication, information about the vehicle such as a vehicle speed, a driving direction, a specific position, and whether an emergency brake is stepped on, and a driver of the surrounding vehicle can obtain the information, to better perceive a traffic condition outside a line of sight, so as to predict a dangerous condition in advance and avoid the dangerous condition. For the V2I communication shown in the figure (2) in FIG. 7, in addition to the foregoing exchange of security information, a roadside infrastructure, for example, a road side unit (road side unit, RSU), may provide various types of service information and data network access for a vehicle, and functions such as electronic toll collection and in-vehicle infotainment greatly improve traffic intelligence.

Figure 8:
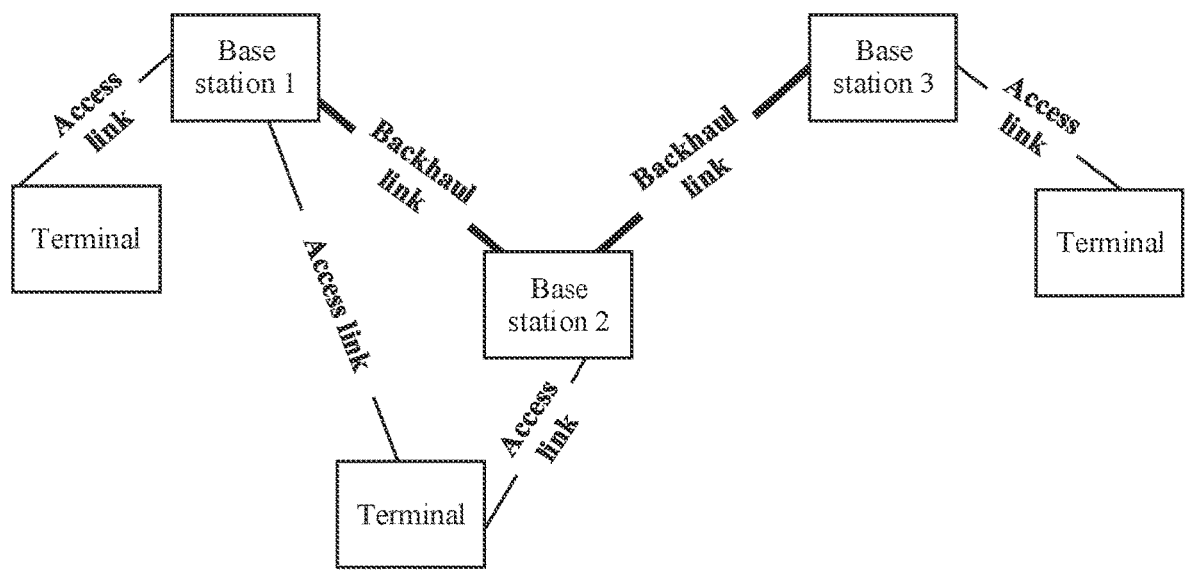
FIG. 8 is a schematic diagram of an IAB system applicable to an embodiment of this application.
Figure 9:
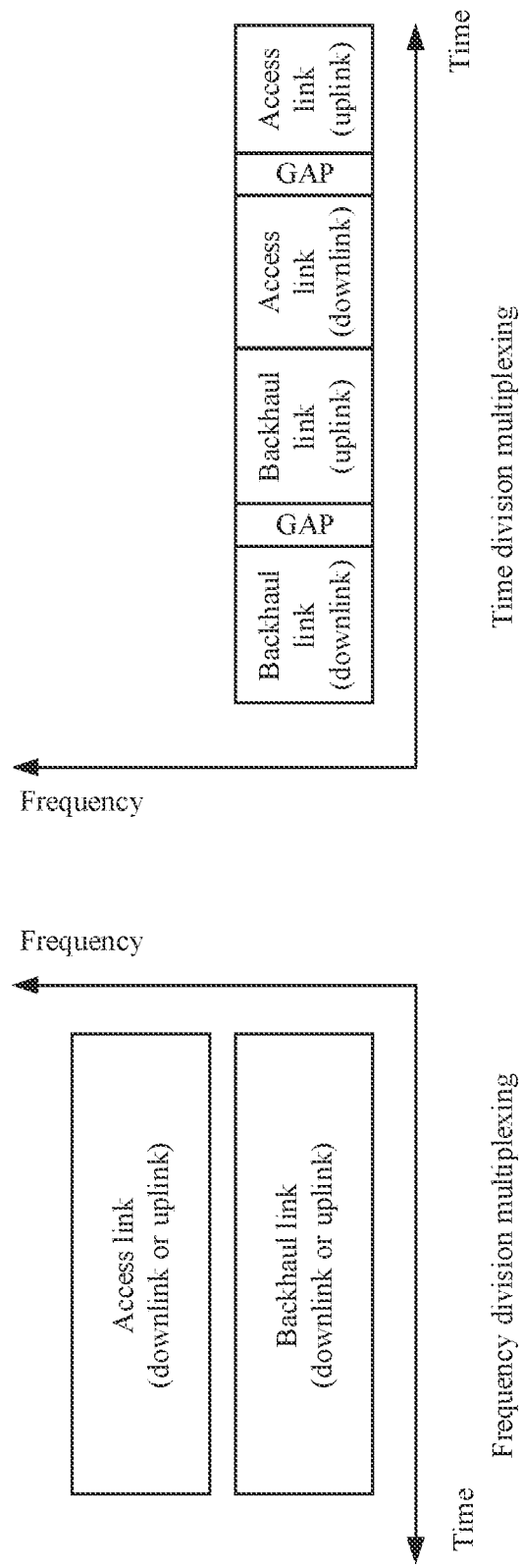
FIG. 9 is a schematic diagram of a multiplexing manner, of an access link and a backhaul link, applicable to an embodiment of this application.

In another possible manner, as shown in FIG. 8 and FIG. 9, BWPs used for sending and receiving on a backhaul link in integrated access and backhaul (integrated access and backhaul, IAB) are grouped into a separate group. The separate group may be one or more separate groups. The backhaul link is a link used for backhaul data transmission between base stations.

It should be particularly noted that, in the embodiments of this application, "BWP group X" and "BWP group ID=X" are usually interchangeably used, but meanings of "BWP group X" and "BWP group ID=X" may be understood by a person skilled in the art. Both "BWP group X" and "BWP group ID=X" may indicate that an index or an identifier of a BWP group is X, where X may be 0, 1, 2, . . . . For example, both "BWP group 0" and "BWP group ID=0" indicate that an index or an identifier of a BWP group is 0. "Cell Y" and "cell index=Y" are also usually interchangeably used, but meanings of "cell Y" and "cell index=Y" may be understood by a person skilled in the art. Both "cell Y" and "cell index=Y" may indicate that an index or an identifier of a cell is Y, where Y may be 0, 1, 2, . . . . For example, both "cell 0" and "cell index=" indicate that an index or an identifier of a cell is 0.

It should be further noted that in the embodiments of this application, a "protocol" may be a standard protocol in the communications field, for example, may include an LTE protocol, an NR protocol, and a related protocol applied to a future communications system. This is not limited in this application.

It should be further noted that in the embodiments of this application, terms "network" and "system" are usually interchangeably used, but meanings of the terms may be understood by a person skilled in the art. Terms "carrier unit" and "carrier" are usually interchangeably used, but meanings of the terms may be understood by a person skilled in the art. Terms "Information (information)", "signal (signal)", "message (message)", and "channel (channel)" may be interchangeably used sometimes. It should be noted that meanings expressed by the terms are consistent when differences of the terms are not emphasized. Terms "of (of)", "corresponding or relevant (corresponding, relevant)", and "corresponding (corresponding)" may be interchangeably used sometimes. It should be noted that meanings expressed by the terms are consistent when differences of the terms are not emphasized.

It should be further noted that in the embodiments of this application, terms "identifier (identifier, ID)" and "index (index)" are usually interchangeably used, but meanings of the terms may be understood by a person skilled in the art. It should be noted that meanings expressed by the terms are consistent when differences of the terms are not emphasized.

It should be further noted that, in the embodiments of this application, "at least one" may represent "one or more". For example, that at least one of a manner A, a manner B, or a manner C is used for implementation represents that the manner A is used for implementation, the manner B is used for implementation, or the manner C is used for implementation; or may represent that the manner A and the manner B are used for implementation, the manner B and the manner C are used for implementation, the manner A and the manner C are used for implementation; or may represent that the manner A, the manner B, and the manner C are used for implementation. Similarly, "at least two" may represent "two or more".

It should be further noted that, in the embodiments below, "first", "second", "third", and the like are intended to distinguish between different objects, but should not constitute any limitation on this application, For example, "semi-static first HARQ codebook" and "semi-static second HARQ codebook" both represent semi-static HARQ codebooks, and "first" and "second" are used to distinguish between semi-static HARQ codebooks generated in different manners.

It should be noted that "and/or" describes an association relationship between associated objects and represents that three relationships may exist. For example, A and/or B may represent the following three cases: Only A exists, both A and B exist, and only B exists. The character "/" generally indicates an "or" relationship between the associated objects. The term "at least one" means one or more. The term "at least one of A and B", similar to the term "A and/or B", describes an association relationship between associated objects and represents that three relationships may exist. For example, at least one of A and B may represent the following three cases: Only A exists, both A and B exist, and only B exists. The following describes technical solutions provided in this application in detail with reference to the accompanying drawings.

It should be understood that a method, provided in this application, for generating a hybrid automatic repeat request HARQ codebook may be applicable to a wireless communications system, for example, the wireless communications system 100 shown in FIG. 1. In the embodiments of this application, a terminal device may simultaneously communicate with one or more network devices. For example, the network device in the embodiments of this application may correspond to any one or more of the network device #1 111, the network device #2 112, and the network device #3 113 in FIG. 1, and the terminal device in the embodiments of this application may correspond to the terminal device 121 in FIG. 1.

Without loss of generality, the following describes the embodiments of this application in detail by using an interaction process between one terminal device and one network device as an example. The terminal device may be any terminal device that is in the wireless communications system and that has a wireless connection relationship with the one or more network devices. It may be understood that any terminal device in the wireless communications system may implement wireless communication based on a same technical solution. This is not limited in the embodiments of this application.

Figure 10:
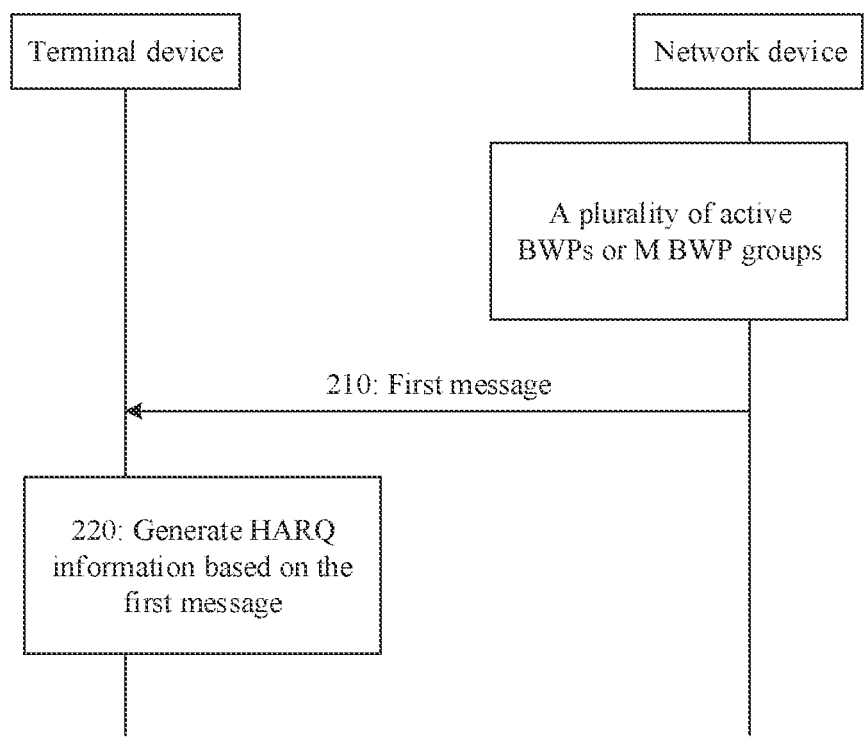
FIG. 10 is a schematic interaction diagram of a method, for generating HARQ information, applicable to an embodiment of this application.

FIG. 10 is a schematic flowchart, shown from a perspective of device interaction, of a method 200 for generating hybrid automatic repeat request HARQ information according to an embodiment of this application. As shown in the figure, the method 200 shown in FIG. 10 may include step 210 and step 220. The following describes the method 200 in detail with reference to FIG. 10.

210: A terminal device receives a first message sent by a network device, where the first message is used to indicate that there are a plurality of active bandwidth parts BWPs in a cell or that there are M BWP groups in a cell.

220: The terminal device generates HARQ information based on the first message.

According to this embodiment of this application, when a cell (for example, a first cell) includes a plurality of active BWPs, HARQ information may be generated according to this embodiment of this application. The plurality of active BWPs or the M BWP groups may be located on a same carrier in the cell, or may be located on different carriers in the cell. This is not limited in this embodiment of this application.

The following separately describes a manner of generating the HARQ information in two cases, where the two cases are a case in which the network device sends information about the BWP group to the terminal device, and a case in which the network device sends information about the plurality of active BWPs to the terminal device.

Case A: The network device sends the information about the BWP group (namely, the BWP group) to the terminal device.

The network device may send the information about the M BWP groups to the terminal device. After receiving the information about the M BWP groups, the terminal device may generate the HARQ information based on the information about the M BWP groups. Optionally, the M BWP groups include N BWPs, the BWP group includes an active BWP, M and N are integers greater than or equal to 2, and M≤N. That the BWP group includes an active BWP may be: Each of the M BWP groups includes one active BWP, or one of the M BWP groups includes one active BWP, or some of the M BWP groups include one active BWP. In addition, a part of the M BWP groups each may alternatively include a plurality of active BWPs, or a part of the M BWP groups each include no active BWP. This is not limited in this embodiment of this application. It should be noted that when the network device sends the information about the M BWP groups to the terminal device, the network device may also notify the terminal device of a specific BWP that is an active BWP in the BWP group, or the terminal device may determine, according to a predefined rule, a specific default BWP that is an active BWP This is not limited in this embodiment of this application. Active BWPs in different times may be different. A change of active BWPs in different times is referred to as BWP switching.

Optionally, each BWP group has an ID, to distinguish between different BWP groups. In other words, each BWP group may be indicated by the ID. For example, a plurality of BWPs configured by the network device for the terminal device are grouped into two BWP groups, which are separately denoted as a BWP group 1 and a BWP group 2.

When a cell is extended and includes a plurality of active BWPs, and the plurality of active BWPs may be located on a same carrier or different carriers of the cell, a HARQ codebook is generated based on an idea of BWP grouping. In other words, when a cell is extended and includes a plurality of downlink carriers, or a carrier includes a plurality of active DL BWPs, a HARQ codebook is generated based on an idea of BWP grouping. The following separately describes in detail a process of generating a HARQ codebook in two cases, and the two cases are a case in which the plurality of active BWPs are located on a same carrier in the cell and a case in which the plurality of active BWPs are located on different carriers in the cell.

Case 1

The M BWP groups are located on a same carrier in the cell. It may also be understood that a serving cell includes one downlink carrier, and a downlink carrier includes M BWP groups.

In a serving cell, the network device configures N DL BWPs for the terminal device, and groups the N DL BWPs into M BWP groups, where each BWP may be associated with one BWP group. M and N are positive integers, and N≥M. Optionally, each BWP group includes at least one BWP, and a maximum of one BWP is activated. In other words, each BWP group has a maximum of one active BWP. In addition, each BWP group may have an ID, to distinguish between different BWP groups.

Figure 11:
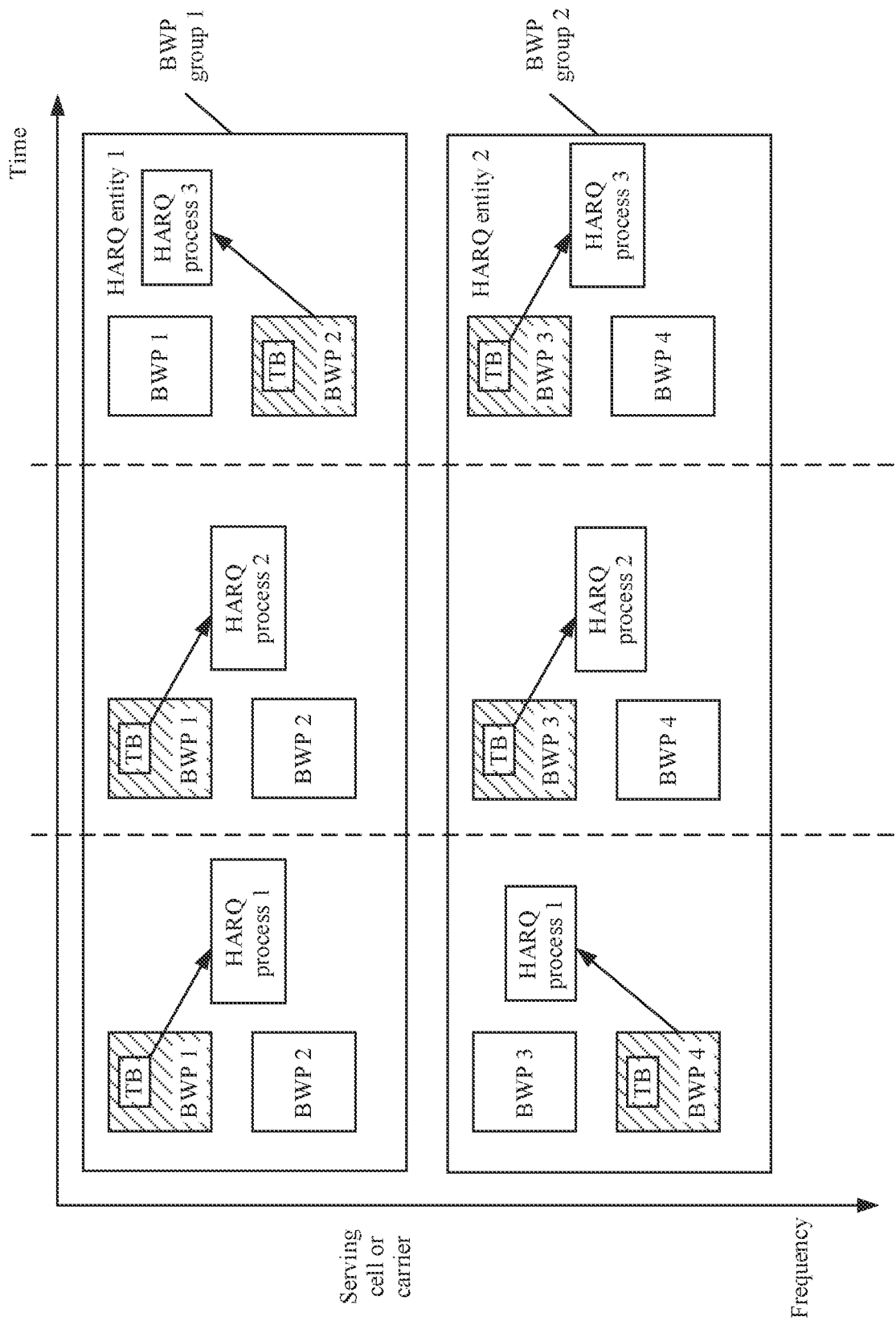
FIG. 11 is a schematic diagram of BWP grouping applicable to an embodiment of this application.

Specifically, FIG. 11 is a schematic diagram of BWP grouping. As shown in FIG. 11, in a serving cell, it is assumed that a network device configures, for a terminal device, four BWPs: a BWP 1, a BWP 2, a BWP 3, and a BWP 4. The four BWPs may be grouped into two groups. For example, the BWP 1 and the BWP 2 are grouped into a group, which is denoted as a BWP group 1; and the BWP 3 and the BWP 4 are grouped into a group, which is denoted as a BWP group 2. As shown in FIG. 11, in a time, active BWPs may include the BWP 1 in the BWP group 1 and the BWP 4 in the BWP group 2. Alternatively, in another time, active BWPs may include the BWP 1 in the BWP group 1 and the BWP 3 in the BWP group 2. Alternatively, in another time unit, active BWPs may include the BWP 2 in the BWP group 1 and the BWP 3 in the BWP group 2.

The active BWP in the BWP group may be the same or may be different in different times.

It should be noted that the time in this embodiment of this application may be a time unit, to be specific, a subframe, a mini-subframe, a slot, a mini-slot, an orthogonal frequency division multiplexing (orthogonal frequency division multiplexing, OFDM) symbol, a time unit smaller than an OFDM symbol, or a time unit larger than a subframe. This is not limited in this application.

A HARQ codebook is generated for a specific PUCCH or PUSCH resource used for reporting HARQ information. Without loss of generality, one PUCCH group is used as an example for description in this embodiment of this application.

A manner of generating a HARQ codebook includes a manner of generating a semi-static codebook and a manner of generating a dynamic codebook. The following separately describes the manner of generating a semi-static codebook and the manner of generating a dynamic codebook.

Semi-Static HARQ Codebook:

A semi-static HARQ codebook is a codebook generation mode in which a size of a HARQ codebook can be determined before data sending and does not change with an actual data sending situation. The size of the codebook may be determined based on some RRC parameter configurations or predefined parameters.

As described above, types of downlink data for which HARQ information needs to be fed back include: a PDSCH, an SPS PDSCH release, and the like. For brief description, in this embodiment of this application, that the downlink data for which HARQ information needs to be fed back is the PDSCH is used as an example for description. It should be understood that, when the downlink data for which HARQ information needs to be fed back is other downlink data, for example, the SPS PDSCH release, a corresponding solution also falls within the protection scope of this application.

Optionally, the terminal device determines, based on the ID of the BWP group, a PDSCH receiving occasion set corresponding to the active BWP in the BWP group, and generates at least one semi-static HARQ codebook.

Specifically, generation of the semi-static HARQ codebook may include the following two steps.

Step 1: For a configured serving cell, a candidate PDSCH receiving occasion set corresponding to an active DL BWP in a BWP group may be determined based on an ID of the BWP group and the active DL BWP in the BWP group. Each BWP group has one candidate PDSCH receiving occasion set.

In a possible manner, the terminal device may determine the candidate PDSCH receiving occasion set corresponding to the active BWP in the BWP group based on a sequence of the ID of the BWP group, for example, in ascending order or descending order of IDs of BWP groups, and generate HARQ information. Alternatively, in another possible manner, the terminal device may determine the candidate PDSCH receiving occasion set based on a predefined sequence, and generate HARQ information.

Optionally, when a BWP group includes a plurality of active BWPs, in the BWP group, a candidate PDSCH receiving occasion set may alternatively be determined based on a sequence of an ID of the BWP.

It should be understood that, in this embodiment of this application, PDSCHs at all possible positions may be used as candidate PDSCHs, and the candidate PDSCHs include a set of various candidate PDSCHs in all search spaces configured by the network device.

Determining of the candidate PDSCH receiving occasion set is related at least to the following factors:

(1) A set of K1 values associated with an active UL BWP.

Figure 12:
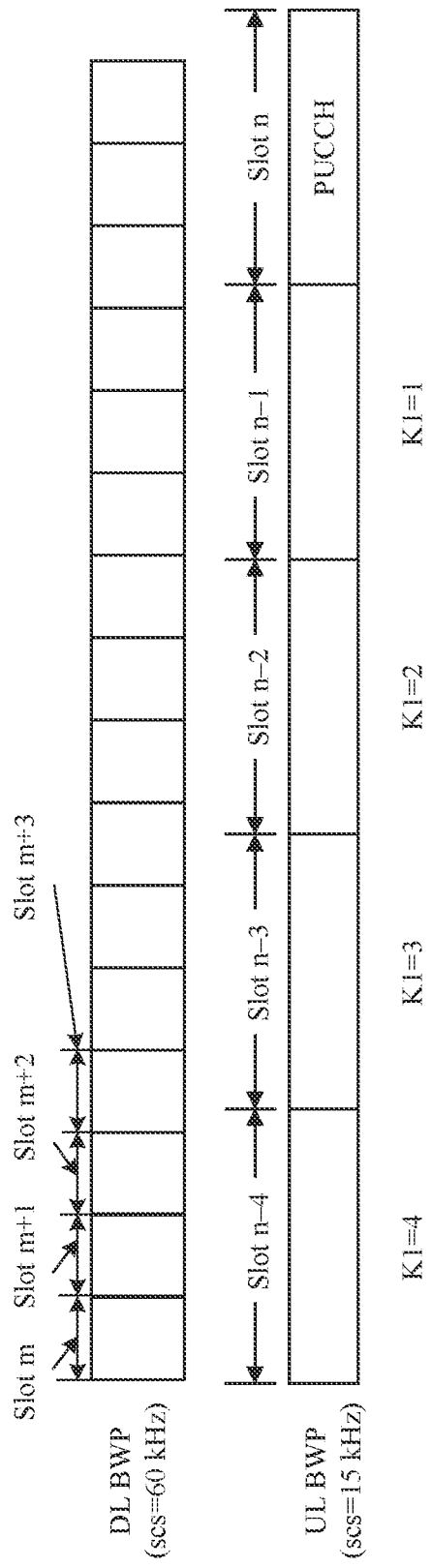
FIG. 12 is a schematic diagram of K1 values applicable to an embodiment of this application.

A value of a slot timing value K1 is related to a DCI format that is configured for the terminal device and that needs to be monitored by the terminal device. FIG. 12 is a schematic diagram of K1 values. A slot timing value K1 may also be referred to as a timing value from downlink data to HARQ feedback information of the downlink data, and a quantity of slots between the downlink data and the HARQ feedback information of the downlink data is a value of the slot timing value. For example, a PUCCH for feeding back HARQ information is located in a slot n. That K1=1 indicates that the PUCCH located in the slot n needs to include HARQ feedback information of a PDSCH in a slot n−1. By analogy, that K1=2, 3, or 4 respectively indicates that the PUCCH in the slot n needs to include HARQ feedback information of a PDSCH in a slot n−2, n−3, or n−4. It should be noted that when a numerology of the DL BWP is different from a numerology of the UL BWP, as shown in FIG. 12, a slot length corresponding to a K1 value is consistent with a slot length of a UL BWP, to be specific, that K1=1 corresponds to a slot corresponding to one UL BWP. In the figure, a slot of one UL BWP corresponds to slots of a plurality of DL BWPs. As shown in the figure, a slot corresponding to that K1=4 corresponds to four slots: a slot m, a slot m+1, a slot m+2, and a slot m+3. When the terminal is configured with a DCI format 1_0 that needs to be monitored by the terminal, the set of K1 values is a predefined set {1, 2, 3, 4, 5, 6, 7, 8}. When the terminal is configured with a DCI format 1_1 that needs to be monitored by the terminal, the set of K1 values is determined based on an RRC configuration parameter.

(2) PDSCH time domain resource allocation table (RRC configuration parameters associated with the active DL BWP) Main components of the time domain resource allocation table are shown in Table 2 below. In the table, a set of parameters for PDSCH time domain resource allocation are defined. Parameters in each row include a slot offset K0 between a PDCCH and a PDSCH, a PDSCH start symbol, a symbol length, and a PDSCH mapping type.

(3) Uplink and downlink semi-static configuration (including cell-level configuration and terminal-specific configuration)

Figure 13:
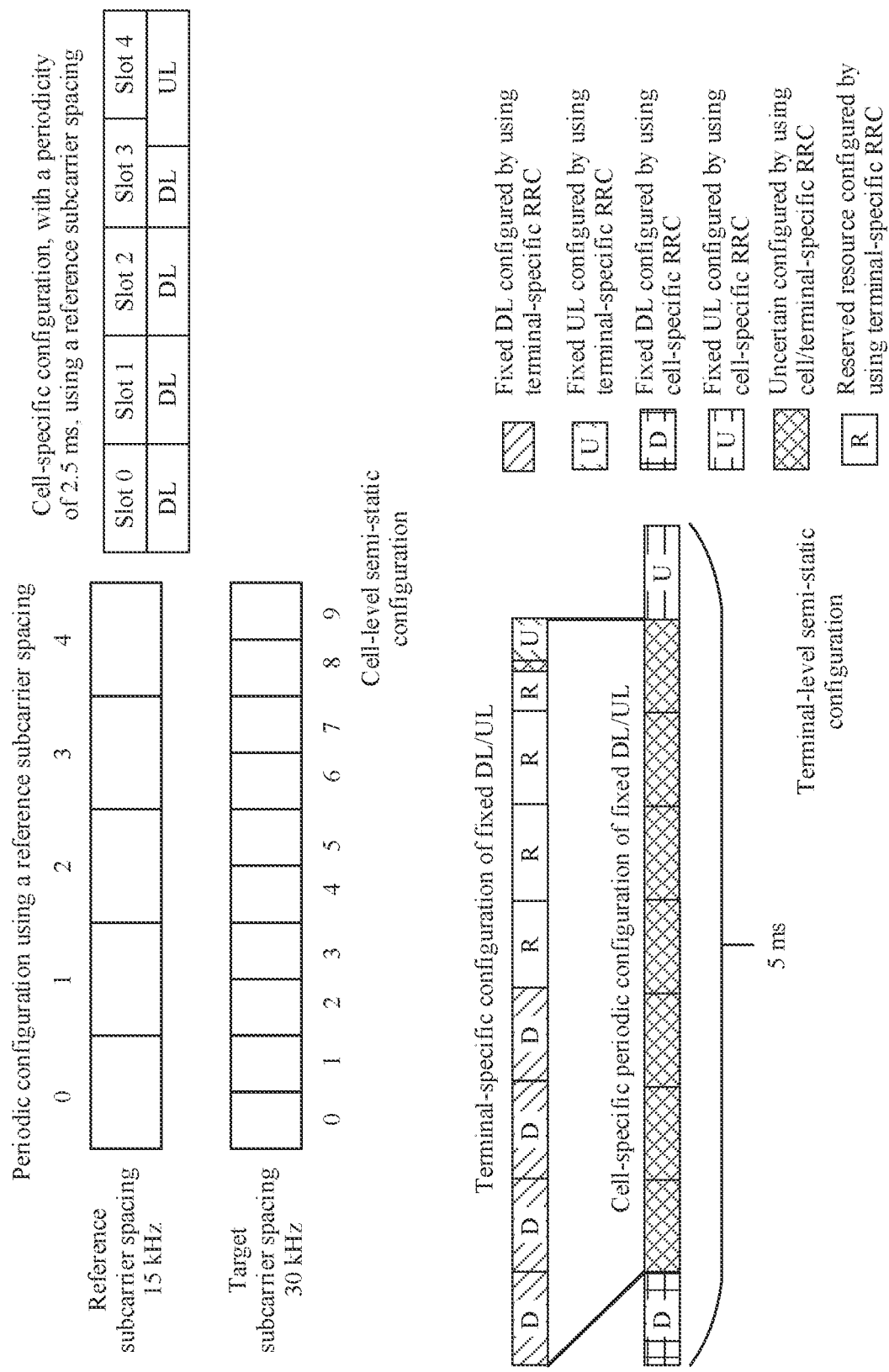
FIG. 13 is a schematic diagram of uplink and downlink semi-static configuration applicable to an embodiment of this application.

FIG. 13 is a schematic diagram of uplink and downlink semi-static configuration, including cell-level semi-static configuration and terminal-level semi-static configuration. In an NR system, to support flexible/dynamic TDD, a DL/UL transmission direction in each time unit (a slot, a symbol, or the like) may be configured by using higher layer signaling and/or physical layer group common DCI. In a possible implementation, one periodicity is configured. For example, in FIG. 13, a periodicity of cell-level configuration at the top is 2.5 ms, and occupies a slot length corresponding to five 30 kHz subcarrier spacings; a configuration periodicity in the following sub-figure is 5 ms. In this periodicity, some fixed time units may be configured for uplink UL transmission, some fixed time units may be configured for downlink DL transmission, or some reserved (reserved) resources may be configured. A remaining resource/time unit in the periodicity may be flexibly/dynamically assigned as a DL, UL, or reserved/blank resource. As shown in the middle of FIG. 13, one DL time unit and one UL time unit are configured in the cell-level configuration, and other resources are reserved resources. However, a specific quantity of DL time units and UL time units are configured in the terminal-level configuration.

TABLE 2

| Index (index) | K0 | Start symbol (start symbol) | Symbol length | Type (type) |
|---|---|---|---|---|
| 0 | 0 | 0 | 7 | A |
| 1 | 0 | 3 | 2 | B |
| 2 | 0 | 4 | 2 | B |
| 3 | 1 | 5 | 2 | B |
| 4 | 1 | 5 | 4 | B |
| 5 | 0 | 7 | 7 | B |

Determining of the candidate PDSCH receiving occasion set in each active BWP is related to parameters in (1), (2), and (3). A preliminary set of time units in which candidate PDSCHs are located is first determined based on the set of K1 values, then possible time units that are used to carry the PDSCHs and that are determined based on specific parameters in the PDSCH time domain resource allocation table are compared with a time unit fixedly used for uplink transmission in the uplink and downlink semi-static configuration, and the time unit that is already configured for uplink transmission is excluded from the possible time units that are used to carry the PDSCHs, to finally obtain the candidate PDSCH receiving occasion set.

It should be noted that an inactive BWP group may not be processed. The inactive BWP group is a BWP group that does not include an active BWP Step 2: HARQ information of data in each serving cell is determined in sequence based on a sequence of the serving cell, and a final HARQ codebook is obtained after HARQ information of data in all serving cells is determined. For a terminal that is configured with CA, a quantity of serving cells is greater than or equal to 2. For a terminal that is not configured with CA, a quantity of serving cells is 1.

In addition to a size of the candidate PDSCH receiving occasion set in step 1, a size of the HARQ codebook is also related to a quantity of serving cells configured for the terminal, whether HARQ information spatial bundling is configured, a maximum quantity of codewords (codeword, CW) that can be scheduled by each piece of DCI (which is equivalent to a maximum quantity of transport blocks that can be scheduled in a same time unit), whether a CBG transmission mode is configured, and a quantity of code block groups (coded block group, CBG) included in a next transport block (transport block, TB) in the CBG transmission mode. Optionally, the network device sends a second message to the terminal device, where the second message is used to indicate at least one of the following: a quantity of CWs of the active BWP in the BWP group, a quantity of CBGs of the active BWP in the BWP group, and HARQ information spatial bundling indication information; and the terminal device determines a quantity of bits of the HARQ information based on the second message. Optionally, the quantity of bits of the HARQ information corresponding to the BWP group is determined based on a maximum value of the quantity of the CWs or the CBGs of all active BWPs included in the BWP group. Information used to indicate the quantity of the CWs or the CBGs of the active BWP and the information used to indicate the BWP group may be RRC configuration information. It should be noted that, for brief description, the quantity of the CWs of the BWP in this specification is a maximum quantity of codewords (codeword, CW) that can be scheduled by each piece of DCI in the BWP (which is equivalent to a maximum quantity of transport blocks that can be scheduled in a same time unit). In this specification, spatial bundling refers to HARQ information spatial bundling.

Optionally, whether to perform spatial bundling is configured based on a BWP or a BWP group. To be specific, a spatial bundling parameter may be independently configured for each BWP or BWP group. This can resolve a problem of a great loss of HARQ information caused by simultaneous bundling configured in a cell group, and an excessively large HARQ codebook caused when spatial bundling is performed for neither the BWP nor the BWP group in the cell group.

Optionally, the quantity of bits of the HARQ information corresponding to the BWP group is related to a quantity of CWs correspondingly configured for the active BWP in the BWP group.

Optionally, the M BWP groups include at least one first BWP group and at least one second BWP group, and a HARQ codebook of the at least one first BWP group carrying first data and a HARQ codebook of the at least one second BWP group carrying second data are independent. The independent codebook means that a size, a sequence, and included HARQ information of the codebook are independently generated.

Specifically, service data carried in each BWP group or a link type may be different. Therefore, HARQ information feedback requirements generated in different BWP groups may also be different. For example, HARQ feedback needs to be quickly performed for service data of ultra-reliable and low-latency communication (ultra-reliable and low-latency communication, URLLC), and feedback for data on a sidelink needs to be performed on the sidelink. As described above, the sidelink is a link between terminal devices, but is not a link between a terminal device and a network device. Therefore, optionally. HARQ information in different BWP groups may independently form HARQ codebooks. HARQ information in a plurality of BWP groups that carry a same type of data and that are in one serving cell or a plurality of serving cells may alternatively form one HARQ codebook for feedback.

Figure 14:
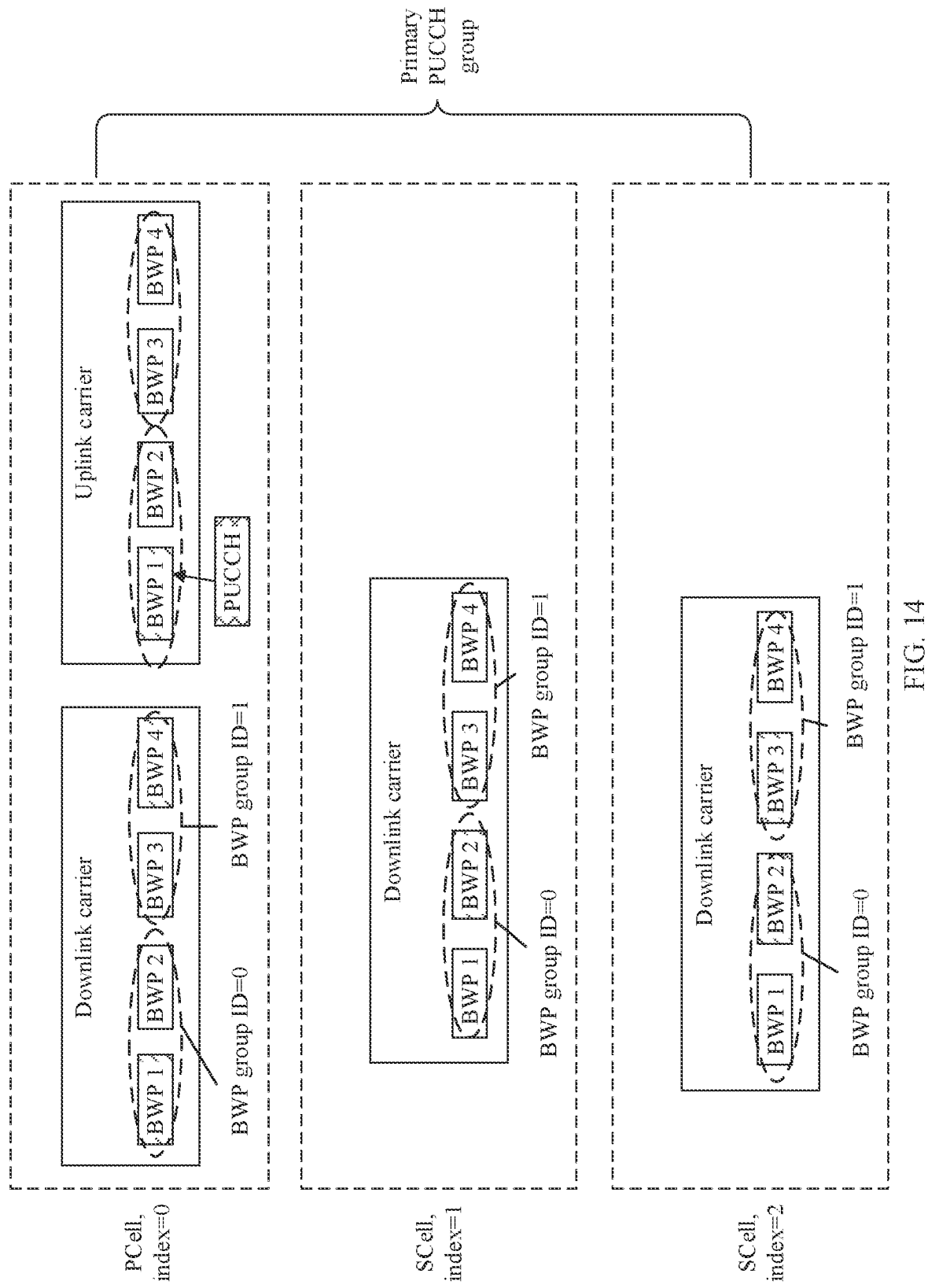
FIG. 14 is a schematic diagram of a scenario, under carrier aggregation, in which a plurality of active BWPs are included, applicable to an embodiment of this application.

Specifically, FIG. 14 is a schematic diagram of a scenario, under carrier aggregation, in which a plurality of active BWPs are included. As shown in FIG. 14, a primary PUCCH group includes one PCell and two SCells, and each cell includes one downlink carrier. It is assumed that an index (index) of the PCell is 0, and indexes of the SCells are an index 1 and an index 2. For a downlink carrier in the primary PUCCH group, HARQ information is fed back by using a PUCCH on an uplink carrier. As shown in FIG. 14, each downlink carrier includes two BWP groups: a BWP group 0 and a BWP group 1. The BWP group 0 includes a BWP 1 and a BWP 2, and the BWP group 1 includes a BWP 3 and a BWP 4. If data of a BWP group 0 in the PCell and data of a BWP group 0 in an SCell 1 are both URLLC data, and data of a BWP group ID=1 in the PCell, data of a BWP group ID=1 in the SCell 1, and data of a BWP group 0 and a BWP group 1 in an SCell 2 are all enhanced mobile broadband (enhanced mobile broadband, eMBB) data. HARQ information in the former two BWP groups may form one HARQ codebook, and HARQ information in the latter four BWP groups may form one HARQ codebook. Different codebooks may be separately sent. When data of different BWP groups is data on different links, a principle is also the same. Details are not described herein again.

It should be noted that, in this embodiment of this application, "BWP group X" and "BWP group ID=X" are usually interchangeably used, but meanings of "BWP group X" and "BWP group ID=X" may be understood by a person skilled in the art. Both "BWP group X" and "BWP group ID=X" may indicate that an ID of a BWP group is X, where X may be 0, 1, 2, . . . . For example, both "BWP group 0" and "BWP group ID=O" indicate that an ID of a BWP group is 0.

It should be further noted that, in this embodiment of this application, data of a BWP group indicates data carried in an active BWP in the BWP group.

Dynamic HARQ Codebook:

A dynamic HARQ codebook is a codebook generation mode in which a HARQ codebook dynamically changes based on an actual data scheduling situation.

A dynamic codebook generation manner is implemented by using a counter DAI (counter DAI, C-DAI) and a total DAI (total DAI, T-DAI) included in DCI. The C-DAI is included in a DCI format 1_0 or a DCI format 1_1, and indicates an accumulative quantity of {serving cell, PDCCH monitoring occasion}-pairs (pair) in which a PDSCH scheduled by using a DCI format 1_0 or a DCI format 1_1 or a downlink SPS release indicated by a DC format 1_0 is present up to a current serving cell and a current PDCCH monitoring occasion. Accumulation is performed first in a sequence of a serving cell index and then in a sequence of a PDCCH monitoring occasion index. The T-DAI is included in a DCI format 1_1, and indicates a total quantity of {serving cell, PDCCH monitoring occasion}-pairs in which a PDSCH scheduled by using a DCI format 1_0 or a DCI format 1_1 or a downlink SPS release indicated by a DC format 1_0 is present up to a current PDCCH monitoring occasion. The total quantity can be updated on each PDCCH monitoring occasion.

Figure 15:
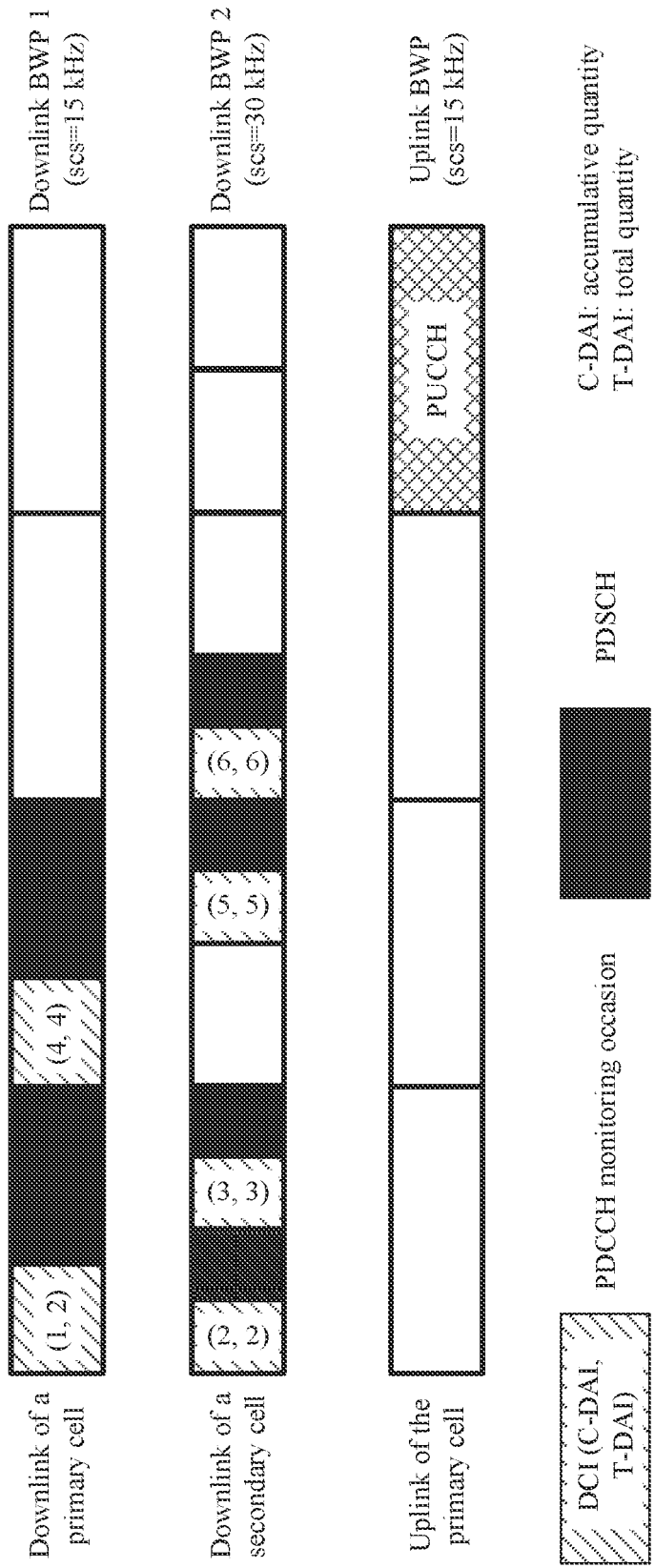
FIG. 15 is a schematic diagram of a manner of calculating a dynamic HARQ codebook.

Specifically, descriptions are provided with reference to FIG. 15. FIG. 15 shows a manner of calculating a dynamic HARQ codebook in the prior art. As shown in FIG. 15, a dynamic HARQ codebook is generated based on a counter DAI and a total DAI of {serving cell, PDCCH monitoring occasion}-pairs. Counting is performed by using a start time of the PDCCH monitoring occasion as a reference, and is performed first in a sequence of a serving cell sequence number and then in a sequence of a PDCCH monitoring occasion.

Figure 16:
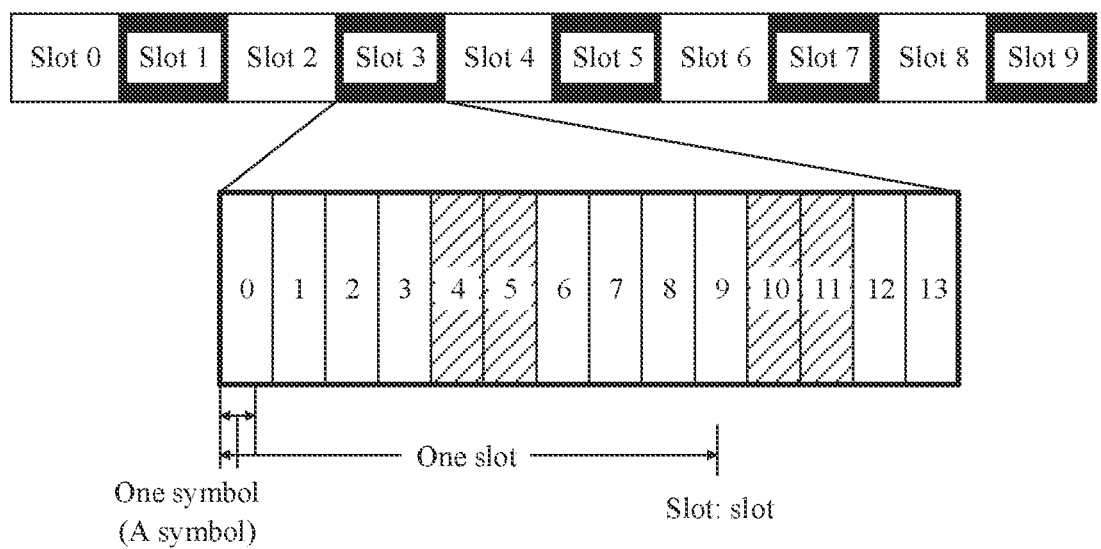
FIG. 16 is a schematic diagram of a PDCCH monitoring occasion applicable to an embodiment of this application.

The PDCCH monitoring occasion (PDCCH monitoring occasion) is a time unit used to monitor a PDCCH, and related parameters are provided in configurations of a search space. The PDCCH monitoring occasion is determined based on three parameters configured through RRC: a PDCCH monitoring periodicity, a PDCCH monitoring offset, and a PDCCH monitoring mode. As shown in FIG. 16, the PDCCH monitoring periodicity is two slots, an offset value is 1, and slots in which monitoring needs to be performed correspond to slot positions in black parts in the figure. Further, the PDCCH monitoring mode is used to indicate a position of a PDCCH monitoring occasion in a slot. In the PDCCH monitoring mode, a 14-bit bitmap (bitmap) is used to indicate a position of a symbol that needs to be monitored. In the figure, a 14-bit indication is a binary number (000011001100), and each bit represents a position of one symbol, where 1 indicates that monitoring is required, and 0 indicates that monitoring is not required. In this way, the fourth, fifth, tenth, and eleventh symbols in slots corresponding to the black parts in the figure need to be monitored.

In the foregoing manner of calculating a dynamic codebook, a case in which a cell includes a plurality of downlink carriers or a downlink carrier includes a plurality of active DL BWPs is not considered.

Based on this, an embodiment of this application provides a method for generating HARQ information, where existing counting that is based on two parameters, that is, {serving cell, PDCCH monitoring occasion}, is extended to counting that is based on three parameters, that is, {serving cell, BWP group ID, PDCCH monitoring occasion}. The method can be applicable to a scenario in which a cell includes a plurality of downlink carriers, or a downlink carrier includes a plurality of active DL BWPs.

Optionally, the network device sends DCI (for example, a fourth message) to the terminal device, where the DCI includes information about a C-DAI (for example, a second C-DAI), and the C-DAI is determined based on the cell, the ID of the BWP group, and the PDCCH monitoring occasion; and the terminal device generates HARQ information (for example, fourth HARQ information) based on the information about the C-DAI.

Optionally, the DCI may further include information about a T-DAI, where the T-DAI is determined based on the cell, the ID of the BWP group, and the PDCCH monitoring occasion; and the terminal device may generate HARQ information based on the C-DAI and the T-DAI.

Specifically, in a possible manner, a serving cell index in frequency domain and a BWP group ID in the serving cell are first combined to generate a global BWP group ID (global BWP group ID), and the global BWP group ID may be a global BWP ID for the terminal device. Then, the C-DAI and the T-DAI are counted based on {global BWP group ID, PDCCH monitoring occasion}.

Figure 17:
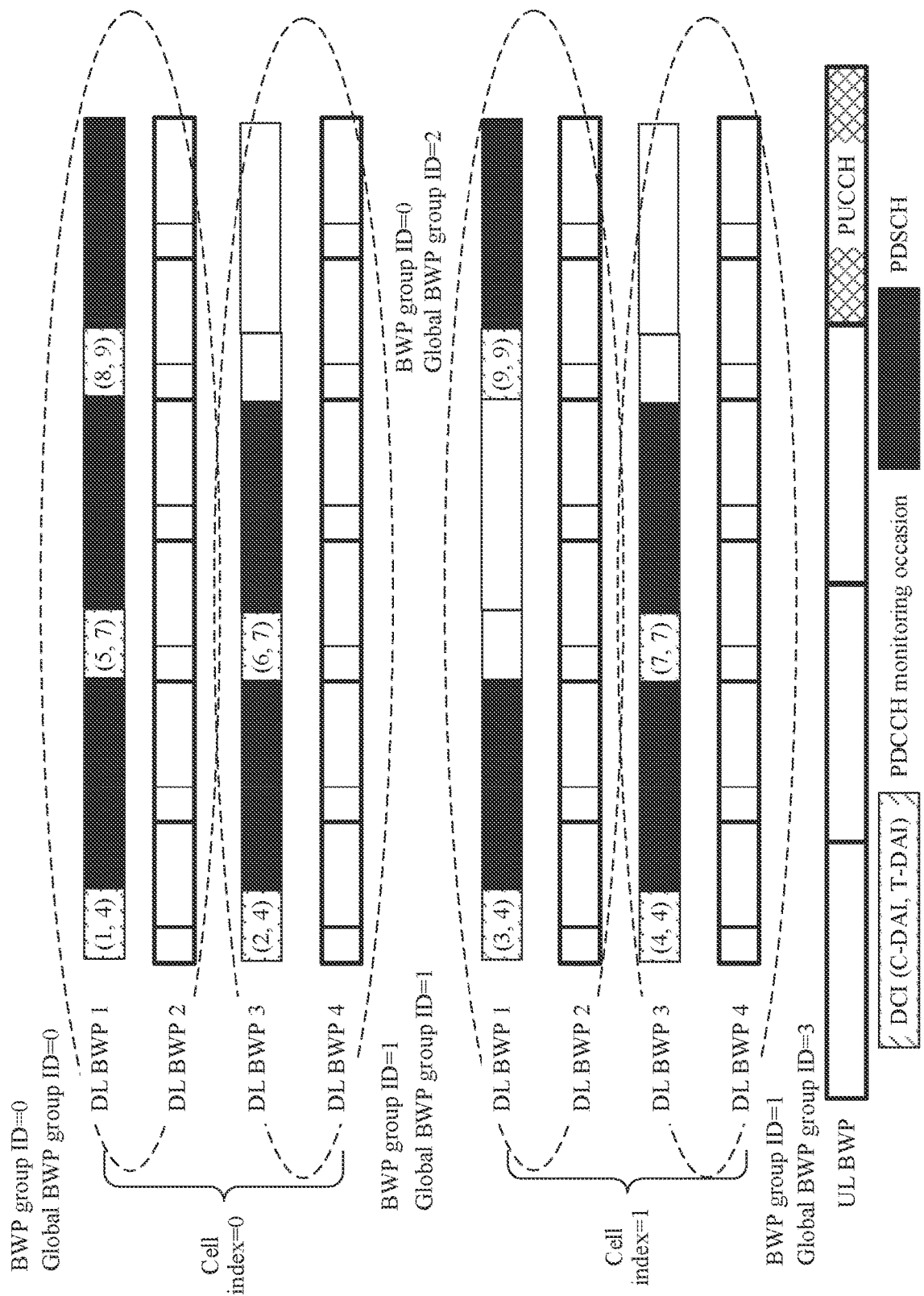
FIG. 17 is a schematic diagram of a manner, of calculating a dynamic HARQ codebook, applicable to an embodiment of this application.

Specifically, as shown in FIG. 17, it is assumed that the network device configures two cells for the terminal device, which are denoted as a cell 0 (that is, a cell index=) and a cell 1 (that is, a cell index=1). The cell 0 includes a DL BWP 1, a DL BWP 2, a DL BWP 3, and a DL BWP 4. Similarly, the cell 1 includes a DL BWP 1, a DL BWP 2, a DL BWP 3, and a DL BWP 4. The DL BWP 1 and the DL BWP 2 are grouped into a group, which is denoted as a BWP group ID=0, and the DL BWP 3 and the DL BWP 4 are grouped into a group, which is denoted as a BWP group ID=1. The DL BWP 1 and the DL BWP 3 are active BWPs.

First, a serving cell index in frequency domain and a BWP group ID in the serving cell are combined, to generate a global BWP group ID. Optionally, a formula for generating the global BWP group ID is: global BWP group ID=cell index*M+BWP group ID, where M is a quantity of BWP groups in one cell. Specifically, as shown in FIG. 17, a global BWP group ID=0, a global BWP group ID=1, a global BWP group ID=2, and a global BWP group ID=3 that correspond to active BWPs are obtained.

Then, the C-DAI and the T-DAI are counted based on {global BWP group ID. PDCCH monitoring occasion}. In the figure, two numbers in the brackets separately represent values of the C-DAI and the T-DAI, that is, (C-DAI, T-DAI). As shown in FIG. 17, (1, 4) may be obtained based on a global BWP group ID on the first PDCCH monitoring occasion, where there are four global BWP groups. Therefore, the T-DAI is 4. A principle of counting a value in (C-DAI, T-DAI) on a subsequent PDCCH monitoring occasion is the same as that on the first PDCCH monitoring occasion, and details are not described herein again.

In another possible manner, when the C-DAI or the T-DAI is counted based on {serving cell, BWP group ID, PDCCH monitoring occasion}, in addition to the sequence of the serving cell sequence number, a sequence of the BWP group ID may also be added in frequency domain for sorting.

Optionally, service data carried in each BWP group or a link type may be different. Therefore, HARQ information feedback requirements generated in different BWP groups may also be different. During generation of the dynamic HARQ codebook, a plurality of independent groups of C-DAIs and T-DAIs may alternatively be counted based on a type of the carried service data or the link type, and a plurality of HARQ codebooks are separately generated for feedback.

Optionally, when independent HARQ codebooks are generated based on BWP groups that carry different types of data, a start time and an end time of a PDCCH monitoring occasion are determined based on a minimum K1 value and a maximum K1 value of an active BWP in BWP groups that carry a same type of data.

Figure 18:
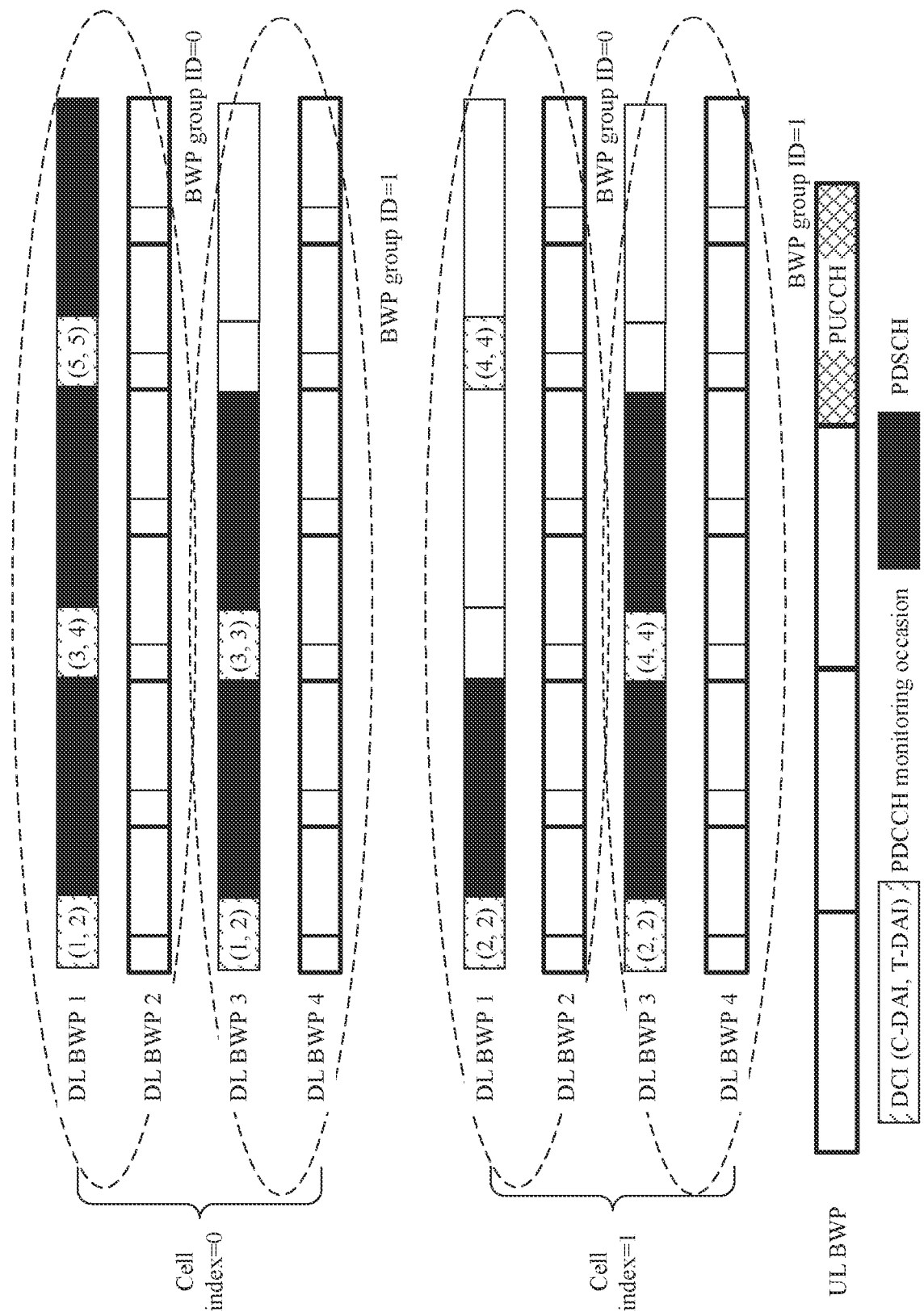
FIG. 18 is a schematic diagram of another manner, of calculating a dynamic HARQ codebook, applicable to an embodiment of this application.

Specifically, as shown in FIG. 18, it is assumed that data of a BWP group ID=0 in a cell 0 and data of a BWP group ID=1 in a cell 1 are data of a same type, for example, are both URLLC data; and data of a BWP group ID=1 in the cell 0 and data of a BWP group ID=0 in the cell 1 are data of a same type, for example, are both eMBB data. In this case, HARQ information in the former two BWP groups may form a HARQ codebook, and a start time and an end time of a PDCCH monitoring occasion are determined based on a maximum value and a minimum value in a set of K values corresponding to a DL BWP 1 in the cell 0 and a set of K1 values corresponding to a DL BWP 3 in the cell 1. HARQ information in the latter two BWP groups may form a HARQ codebook, and a start time and an end time of a PDCCH monitoring occasion are determined based on a maximum value and a minimum value in a set of K values corresponding to a DL BWP 3 in the cell 0 and a set of K values corresponding to a DL BWP 1 in the cell 1. Different codebooks may be separately sent. When data of different BWP groups is data on different links, a principle is also the same. Details are not described herein again.

It should be noted that the foregoing two possible manners and specific embodiments are merely examples for description, and the embodiments of this application are not limited thereto. In addition, for the position of the data, the C-DAI and the T-DAI may alternatively be counted first in time domain and then in frequency domain.

The foregoing mainly describes, by using an example, the case in which the network device sends, to the terminal device, the information used to indicate the BWP groups, where the BWP groups are located on a same carrier, to be specific, a serving cell includes one downlink carrier and a downlink carrier includes a plurality of active DL BWPs. The following mainly briefly describes the case in which a serving cell includes a plurality of downlink carriers.

Case 2:

The M BWP groups are located on different carriers in the cell. It may also be understood that a serving cell includes a plurality of downlink carriers.

In this case, in frequency domain, in addition to an existing serving cell index, a carrier index in the serving cell needs to be newly added. Each carrier includes a plurality of BWPs. Without loss of generality, the following uses a serving cell as an example for description.

Similar to the case 1, the following separately describes a manner of generating a semi-static HARQ codebook and a manner of generating a dynamic HARQ codebook.

Semi-Static HARQ Codebook:

When a serving cell includes a plurality of downlink carriers, a BWP ID may be configured based on each carrier (per carrier), or may be configured based on each serving cell (per serving cell). This is not limited in this embodiment of this application.

Figure 19:
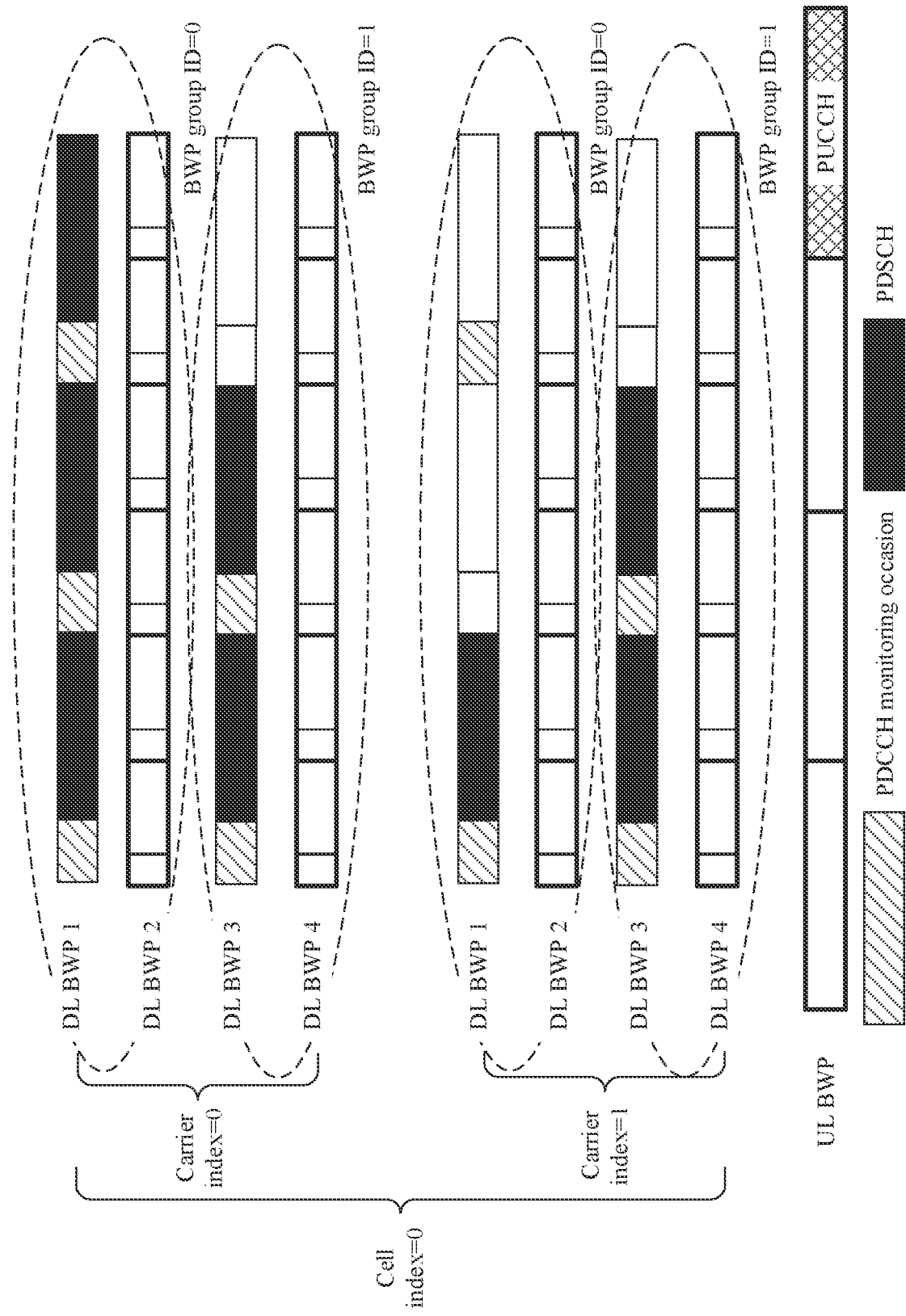
FIG. 19 is a schematic diagram of a serving cell, including a plurality of downlink carriers, applicable to an embodiment of this application.

When the BWP ID is configured per carrier, refer to FIG. 19. A carrier index=0 includes a DL BWP 1, a DL BWP 2, a DL BWP 3, and a DL BWP 4. A carrier index=1 includes a DL BWP 1, a DL BWP 2, a DL BWP 3, and a DL BWP 4. In this case, the manner of generating a semi-static HARQ codebook includes the following two steps.

Step 1: For a configured serving cell, a candidate PDSCH receiving occasion set corresponding to an active DL BWP in each BWP group is determined based on first a sequence of a carrier index and then a sequence of a BWP group ID and based on the active DL BWP in each BWP group. A manner of determining the candidate PDSCH receiving occasion set corresponding to the active DL BWP is described in the case 1. For brevity, details are not described herein again.

Step 2: HARQ information of data in each serving cell is determined in sequence based on a sequence of the serving cell, and a final HARQ codebook is obtained after HARQ information of data in all serving cells is determined. The step 2 is described in detail in the case 1. For brevity, details are not described herein again.

Figure 21:
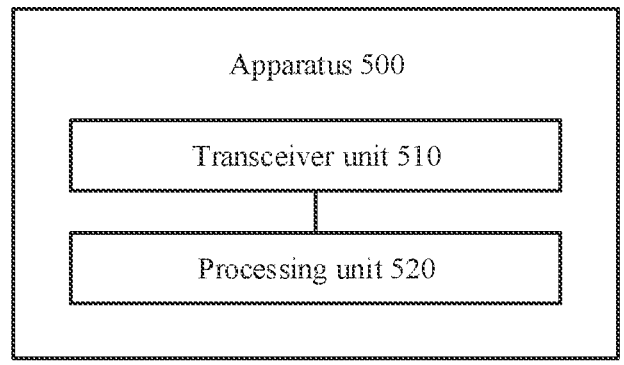
FIG. 21 is a schematic block diagram of an apparatus for generating HARQ information according to an embodiment of this application.

When the BWP ID is configured per serving cell, refer to FIG. 21. The following two steps are mainly included.

Step 1: For a configured serving cell, a candidate PDSCH receiving occasion set corresponding to an active DL BWP in each BWP group is determined based on a BWP group ID (for example, based on a sequence of the BWP group ID) and the active DL BWP in each BWP group.

Step 2: HARQ information of data in each serving cell is determined in sequence based on a sequence of the serving cell, and a final HARQ codebook is obtained after HARQ information of data in all serving cells is determined.

In this case, the manner of generating a semi-static HARQ codebook is similar to the manner of generating a semi-static HARQ codebook in the case 1. For brevity, details are not described herein again.

Dynamic HARQ Codebook:

When the BWP ID is configured per carrier, refer to FIG. 19. A manner of generating the dynamic HARQ codebook may be: Existing counting that is based on two parameters, that is, {serving cell, PDCCH monitoring occasion}, is extended to counting that is based on four parameters, that is, {serving cell, carrier index, BWP group ID, PDCCH monitoring occasion}.

In a possible manner, a serving cell index in frequency domain, a different carrier index in the serving cell, and a different BWP group ID in the serving cell are first combined, to generate a global BWP group ID, and the global BWP group ID may be a global BWP group ID for the terminal device. Then, the C-DAI and the T-DAI are counted based on {global BWP group ID, PDCCH monitoring occasion}. A specific implementation is similar to the manner of generating a dynamic HARQ codebook in the foregoing case 1, and a difference lies in that the carrier index is also considered when the global BWP group ID is generated. For brevity, details are not described herein again.

In another possible manner, when the C-DAI or the T-DAI is counted based on {serving cell, carrier index, BWP group ID, PDCCH monitoring occasion}, in addition to the sequence of the serving cell sequence number, a sequence of the carrier index and a sequence of the BWP group ID may also be added in frequency domain for sorting. A specific implementation is similar to the manner of generating a dynamic HARQ codebook in the case 1, and a difference lies in that the carrier index is also considered. For brevity, details are not described herein again.

Figure 20:
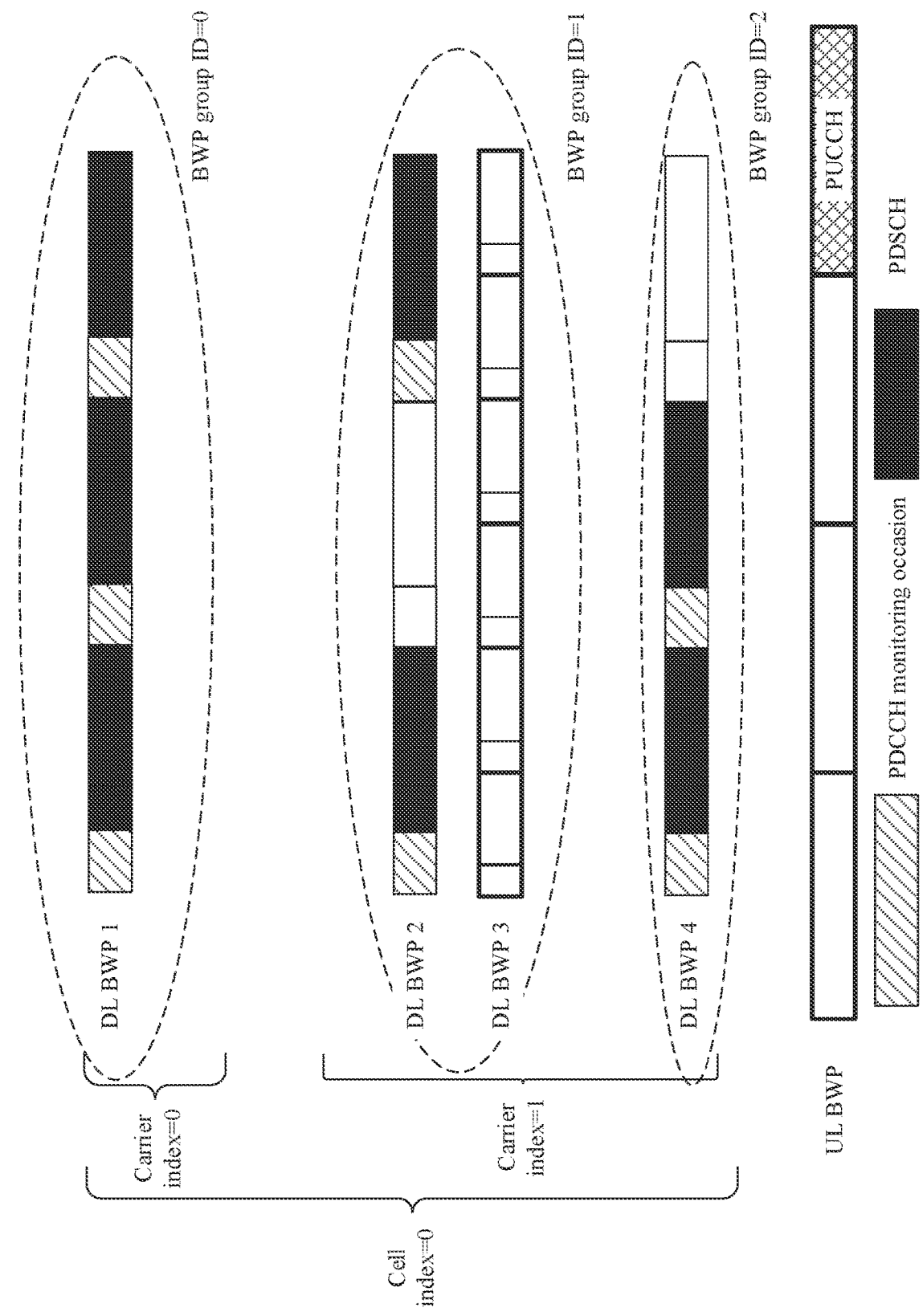
FIG. 20 is a schematic diagram of a BWP ID, configured based on each serving cell, applicable to an embodiment of this application.

When the BWP ID is configured per carrier, refer to FIG. 20. The manner of generating a dynamic HARQ codebook is similar to the manner of generating a dynamic HARQ codebook in the case 1. To be specific, existing counting that is based on two parameters, that is, {serving cell, PDCCH monitoring occasion}, is extended to counting that is based on three parameters, that is, {serving cell, BWP group ID, PDCCH monitoring occasion}. In a possible manner, a serving cell index in frequency domain and a BWP group ID in the serving cell are first combined, to generate a global BWP group ID, and the global BWP group ID may be a global BWP ID for the terminal device. Then, the C-DAI and the T-DAI are counted based on {global BWP group ID, PDCCH monitoring occasion}. In another possible manner, when the C-DAI or the T-DAI is counted based on {serving cell, BWP group ID, PDCCH monitoring occasion}, in addition to the sequence of the serving cell sequence number, a sequence of the BWP group ID may also be added in frequency domain for sorting.

The foregoing mainly describes, by using an example, the case A in which the network device sends the information about the BWP group to the terminal device. The following briefly describes a case B in which the network device sends the information about the plurality of active BWPs to the terminal device.

Case B: The network device sends the information about the plurality of active BWPs to the terminal device.

The network device sends the information about the plurality of active BWPs to the terminal device. After receiving the information about the plurality of active BWPs, the terminal device may generate the HARQ information based on the information about the plurality of active BWPs.

It should be noted that the network device may alternatively send both the information about the plurality of BWP groups and the information about the plurality of active BWPs to the terminal device. This is not limited in the embodiments of this application. The following still provides brief descriptions in two cases.

Case 1

The plurality of active BWPs are located on a same carrier in the cell. It may also be understood that a serving cell includes one downlink carrier, and a downlink carrier includes a plurality of active BWPs.

Semi-Static HARQ Codebook:

Optionally, the terminal device determines, based on the ID of the active BWP, a PDSCH receiving occasion set corresponding to the active BWP; and the terminal device generates HARQ information based on the PDSCH receiving occasion set corresponding to the active BWP, where the HARQ information is a semi-static HARQ codebook.

Specifically, generation of the semi-static HARQ codebook may include the following two steps.

Step 1: For a configured serving cell, a candidate PDSCH receiving occasion set corresponding to an active BWP may be determined based on an ID of the active BWP. In a possible manner, the terminal device may determine the candidate PDSCH receiving occasion set corresponding to the active BWP based on a sequence of the ID of the active BWP, for example, in ascending order or descending order of IDs of active BWPs, and generate HARQ information. Alternatively, in another possible manner, the terminal device may determine the candidate PDSCH receiving occasion set corresponding to the active BWP based on a priority sequence of a service type of data carried in the active BWP, and generate HARQ information. Alternatively, in another possible manner, the terminal device may determine the candidate PDSCH receiving occasion set based on a predefined sequence, and generate HARQ information.

Step 2: HARQ information of data in each serving cell is determined in sequence based on a sequence of the serving cell, and a final HARQ codebook is obtained after HARQ information of data in all serving cells is determined.

It should be understood that, this case is similar to the manner of generating a semi-static HARQ codebook in the case 1 in the foregoing case A, and a difference lies in that the ID of the BWP group is replaced by the ID of the active BWP. For example, in the foregoing, the PDSCH receiving occasion set is determined based on the ID of the BWP group, and the HARQ information is generated; herein, the PDSCH receiving occasion set is determined based on the ID of the active BWP, and the HARQ information is generated. Other specific implementations are similar. For brevity, details are not described herein again.

Dynamic HARQ Codebook:

Optionally, existing counting that is based on two parameters, that is, {serving cell, PDCCH monitoring occasion}, is extended to counting that is based on three parameters, that is, {serving cell, ID of the active BWP, PDCCH monitoring occasion}. The method can be applicable to a scenario in which a cell includes a plurality of downlink carriers, or a carrier includes a plurality of active DL BWPs.

Optionally, the network device sends DCI (for example, a third message) to the terminal device, where the DCI includes information about a C-DAI (for example, a first C-DAI), and the C-DAI is determined based on the cell, the ID of the active BWP, and the PDCCH monitoring occasion; and the terminal device generates HARQ information (for example, third HARQ information) based on the information about the C-DAI.

Optionally, the DCI may further include information about a T-DAI, where the T-DAI is determined based on the cell, the ID of the active BWP, and the PDCCH monitoring occasion; and the terminal device may generate HARQ information based on the C-DAI and the T-DAI.

It should be understood that, this case is similar to the manner of generating a dynamic HARQ codebook in the case 1 in the foregoing case A, and a difference lies in that the ID of the BWP group is replaced by the ID of the active BWP. For example, in the foregoing, the C-DAI and the T-DAI are determined based on the ID of the BWP group, and the HARQ information is generated; herein, the C-DAI and the T-DAI are determined based on the ID of the active BWP, and the HARQ information is generated. Other specific implementations are similar. For brevity, details are not described herein again.

Case 2:

The plurality of active BWPs are located on different carriers in the cell. It may also be understood that a serving cell includes a plurality of downlink carriers.

It should be understood that, this case is similar to the case 2 in the foregoing case A, and the ID of the BWP group in the case A is replaced by the ID of the active BWP in this case. The other parts are similar. For brevity, details are not described herein again.

It should be noted that, to avoid that in a codebook generation process, a network side and a terminal side have inconsistent understanding on a meaning of a codebook due to BWP switching, and consequently HARQ feedback information becomes invalid, when any one of the plurality of active BWPs is switched in a HARQ feedback window (that is, time units determined based on values in a set of K1 values), HARQ information in the HARQ feedback window does not need to be reported.

Similarly, when any active BWP in the M BWP groups is switched in a HARQ feedback window (that is, time units determined based on values in a set of K values). HARQ information in the HARQ feedback window does not need to be reported.

In other words, generated HARQ codebook is reported only when no active BWP or no active BWP in the BWP group is switched in the HARQ feedback window.

The foregoing HARQ information reporting conditions are applicable to all sub-cases in the case A and the case B.

The foregoing describes in detail the method for generating HARQ information according to the embodiments of this application with reference to FIG. 1 to FIG. 20. The following describes in detail an apparatus for generating HARQ information according to embodiments of this application with reference to FIG. 21 to FIG. 23.

FIG. 21 is a schematic block diagram of an apparatus for generating HARQ information according to an embodiment of this application. As shown in FIG. 21, the apparatus 500 may include a transceiver unit 510 and a processing unit 520.

In a possible design, the apparatus 500 may be a terminal device or a chip disposed in the terminal device.

In a possible implementation, the transceiver unit 510 is configured to receive a first message sent by a network device, where the first message is used to indicate that there are a plurality of active bandwidth parts BWPs in a cell or that there are M BWP groups in a cell, the M BWP groups include N BWPs, any BWP group includes an active BWP, M and N are integers greater than or equal to 2, and M≤N; and the processing unit 520 is configured to generate HARQ information based on the first message.

Optionally, when the first message is used to indicate that there are a plurality of active BWPs in a cell, the first message is specifically used to indicate a plurality of identifiers IDs corresponding to the plurality of active BWPs; and the processing unit 520 is specifically configured to: determine, based on the ID of the active BWP a physical downlink shared channel PDSCH receiving occasion set corresponding to the active BWP; and generate first HARQ information based on the PDSCH receiving occasion set corresponding to the active BWP.

Optionally, when the first message is used to indicate that there are M BWP groups in a cell, the first message is specifically used to indicate a plurality of identifiers IDs corresponding to the M BWP groups; and the processing unit 520 is specifically configured to: determine, based on the ID of the BWP group, a PDSCH receiving occasion set corresponding to the active BWP in the BWP group, where the BWP group includes one active BWP; and generate second HARQ information based on the PDSCH receiving occasion set corresponding to the active BWP in the BWP group.

Optionally, the transceiver unit 510 is further configured to receive a second message sent by the network device, where the second message is used to indicate at least one of the following: a quantity of codewords CWs of the active BWP in the BWP group, a quantity of code block groups CBGs of the active BWP in the BWP group, and HARQ information spatial bundling indication information; and the processing unit 520 is configured to determine a quantity of bits of the second HARQ information based on the second message.

Optionally, the processing unit 520 is specifically configured to determine the quantity of bits of the second HARQ information based on a maximum value of the quantity of the CWs or a maximum value of the quantity of the CBGs.

Optionally, when the first message is used to indicate that there are a plurality of active BWPs in a cell, the first message is specifically used to indicate a plurality of identifiers IDs corresponding to the plurality of active BWPs; the transceiver unit 510 is further configured to: receive a third message sent by the network device, where the third message includes information about a first counter downlink assignment index C-DAI, and the first C-DAI is determined based on the cell, the ID of the active BWP, and a physical downlink control channel PDCCH monitoring occasion; and the processing unit 520 is configured to generate third HARQ information based on the information about the first C-DAI.

Optionally, when the first message is used to indicate that there are M BWP groups in a cell, the first message is specifically used to indicate a plurality of identifiers IDs corresponding to the M BWP groups; the transceiver unit 510 is further configured to: receive a fourth message sent by the network device, where the fourth message includes information about a second C-DAI, and the second C-DAI is determined based on the cell, the ID of the BWP group, and a PDCCH monitoring occasion; and the processing unit 520 is configured to generate fourth HARQ information based on the information about the second C-DAI.

Optionally, the M BWP groups include at least one first BWP group and at least one second BWP group, and a HARQ codebook of the at least one first BWP group carrying first data and a HARQ codebook of the at least one second BWP group carrying second data are independent.

Specifically, the apparatus 500 may correspond to the terminal device in the method for generating HARQ information according to the embodiments of this application. The apparatus 500 may include modules configured to perform the method performed by the terminal device in the method 200 of FIG. 10. In addition, the modules in the apparatus 500 and the foregoing other operations and/or functions are separately used to implement corresponding procedures in the method 200 of FIG. 10. Specifically, the transceiver unit 510 is configured to perform step 210 in the method 200, and the processing unit 520 is configured to perform step 220 in the method 200. A specific process in which each unit performs the foregoing corresponding step is described in detail in the method 200. For brevity, details are not described herein again.

In another possible design, the apparatus 500 may be a network device or a chip disposed in the network device.

In a possible implementation, the transceiver unit 510 may be configured to send a first message to a terminal device, where the first message is used to indicate that there are a plurality of active bandwidth parts BWPs in a cell or that there are M BWP groups in a cell, the M BWP groups include N BWPs, any BWP group includes an active BWP, M and N are integers greater than or equal to 2, and M≤N; and the transceiver unit 510 is further configured to receive HARQ information sent by the terminal device.

Optionally, when the first message is used to indicate that there are a plurality of active BWPs in a cell, the first message is specifically used to indicate a plurality of identifiers IDs corresponding to the plurality of active BWPs; and the transceiver unit 510 is specifically configured to: receive first HARQ information sent by the terminal device, where the first HARQ information is generated by the terminal device based on a physical downlink shared channel PDSCH receiving occasion set corresponding to the active BWP, and the PDSCH receiving occasion set corresponding to the active BWP is determined by the terminal device based on the ID of the active BWP.

Optionally, when the first message is used to indicate that there are M BWP groups in a cell, the first message is specifically used to indicate a plurality of identifiers IDs corresponding to the M BWP groups; and the transceiver unit 510 is specifically configured to: receive second HARQ information sent by the terminal device, where the second HARQ information is generated by the terminal device based on a PDSCH receiving occasion set corresponding to the active BWP in the BWP group, the PDSCH receiving occasion set corresponding to the active BWP in the BWP group is determined by the terminal device based on the ID of the BWP group, and the BWP group includes one active BWP.

Optionally, the transceiver unit 510 is further configured to send a second message to the terminal device, where the second message is used to indicate at least one of the following: a quantity of codewords CWs of the active BWP in the BWP group, a quantity of code block groups CBGs of the active BWP in the BWP group, and HARQ information spatial bundling indication information.

Optionally, a quantity of bits of the second HARQ information is determined by the terminal device based on a maximum value of the quantity of the CWs or a maximum value of the quantity of the CBGs.

Optionally, when the first message is used to indicate that there are a plurality of active BWPs in a cell, the first message is specifically used to indicate a plurality of identifiers IDs corresponding to the plurality of active BWPs; the processing unit 520 is further configured to: determine a first counter downlink assignment index C-DAI based on the cell, the ID of the active BWP, and a physical downlink control channel PDCCH monitoring occasion; and the transceiver unit 510 is further configured to send a third message to the terminal device, where the third message includes information about the first C-DAL.

Optionally, when the first message is used to indicate that there are M BWP groups in a cell, the first message is specifically used to indicate a plurality of identifiers IDs corresponding to the M BWP groups; the processing unit 520 is further configured to: determine a second counter downlink assignment index C-DAI based on the cell, the ID of the active BWP, and a physical downlink control channel PDCCH monitoring occasion; and the transceiver unit 510 is further configured to send a fourth message to the terminal device, where the fourth message includes information about the second C-DAI.

Optionally, the M BWP groups include at least one first BWP group and at least one second BWP group, and a HARQ codebook of the at least one first BWP group carrying first data and a HARQ codebook of the at least one second BWP group carrying second data are independent.

Specifically, the apparatus 500 may correspond to the network device in the method for generating HARQ information according to the embodiments of this application. The apparatus 500 may include modules configured to perform the method performed by the network device in the method 200 of FIG. 10. In addition, the modules in the apparatus 500 and the foregoing other operations and/or functions are separately used to implement corresponding procedures in the method 200 of FIG. 10. Specifically, the transceiver unit 510 is configured to perform step 210 in the method 200. A specific process in which each unit performs the foregoing corresponding step is described in detail in the method 200. For brevity, details are not described herein again.

Figure 22:
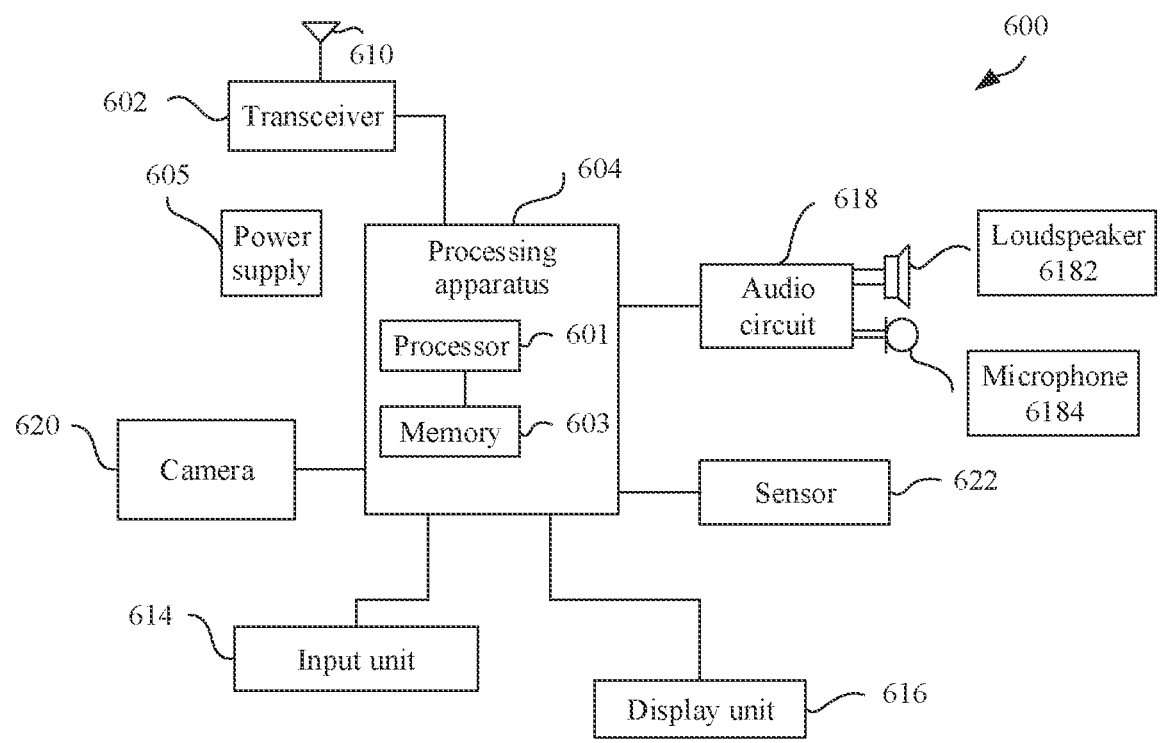
FIG. 22 is a schematic structural diagram of a terminal device according to an embodiment of this application.

FIG. 22 is a schematic structural diagram of a terminal device 600 according to an embodiment of this application. As shown in FIG. 22, the terminal device 600 includes a processor 601 and a transceiver 602. Optionally, the terminal device 600 further includes a memory 603. The processor 601, the transceiver 602, and the memory 603 communicate with each other by using an internal connection path, to transfer a control signal and/or a data signal. The memory 603 is configured to store a computer program. The processor 601 is configured to invoke the computer program from the memory 603 and run the computer program, to control the transceiver 602 to send and receive a signal.

Optionally, the transceiver 602 may alternatively be a communications interface, configured to receive or send information, a signal, data, and the like required for communication. For example, the communications interface may be an element that has a transceiver function, for example, a transmitter (transmitter) or a receiver (receiver). Alternatively, the communications interface may communicate with another device by using the element that has the transceiver function. The element that has the transceiver function may be implemented by an antenna and/or a radio frequency apparatus.

The processor 601 and the memory 603 may be integrated into one processing apparatus 604. The processor 601 is configured to execute program code stored in the memory 603 to implement the foregoing functions. During specific implementation, the memory 603 may alternatively be integrated into the processor 601, or may be independent of the processor 601. The terminal device 600 may further include an antenna 610, configured to send, by using a radio signal, uplink data or uplink control signaling output by the transceiver 602.

Specifically, the terminal device 600 may correspond to the terminal device in the method 200 according to the embodiments of this application. The terminal device 600 may include modules configured to perform the method performed by the terminal device in the method 200 of FIG. 10. In addition, the modules in the terminal device 600 and the foregoing other operations and/or functions are separately used to implement corresponding procedures in the method 200 of FIG. 10. Specifically, the memory 603 is configured to store the program code, so that when executing the program code, the processor 601 performs step 220 in the method 200, and controls the transceiver 602 to perform step 210 in the method 200. A specific process in which each module performs the foregoing corresponding step is described in detail in the method 200. For brevity, details are not described herein again.

The processor 601 may be configured to perform an action internally implemented by the terminal in the foregoing method embodiment, and the transceiver 602 may be configured to perform a transmitting action or a sending action performed by the terminal to the network device in the foregoing method embodiment. For details, refer to the descriptions in the foregoing method embodiment. Details are not described herein again.

The processor 601 and the memory 603 may be integrated into one processing apparatus. The processor 601 is configured to execute the program code stored in the memory 603 to implement the foregoing functions. During specific implementation, the memory 603 may alternatively be integrated into the processor 601.

The terminal device 600 may further include a power supply 605, configured to supply power to various components or circuits in the terminal.

In addition, to make functions of the terminal device more perfect, the terminal device 600 may further include one or more of an input unit 614, a display unit 616, an audio circuit 618, a camera 620, a sensor 622, and the like, and the audio circuit may further include a speaker 6182, a microphone 6184, and the like.

Figure 23:
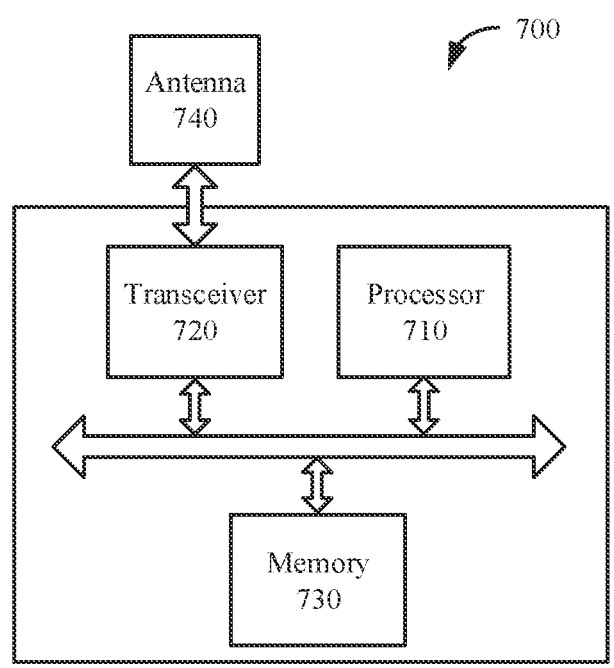
FIG. 23 is a schematic structural diagram of a network device according to an embodiment of this application.

FIG. 23 is a schematic structural diagram of a network device 700 according to an embodiment of this application. As shown in FIG. 23, the network device 700 includes a processor 710 and a transceiver 720. Optionally, the network device 700 further includes a memory 730. The processor 710, the transceiver 720, and the memory 730 communicate with each other by using an internal connection path, to transfer a control signal and/or a data signal. The memory 730 is configured to store a computer program. The processor 710 is configured to invoke the computer program from the memory 730 and run the computer program, to control the transceiver 720 to send and receive a signal.

Optionally, the transceiver 720 may alternatively be a communications interface, configured to receive or send information, a signal, data, and the like required for communication. For example, the communications interface may be an element that has a transceiver function, for example, a transmitter (transmitter) or a receiver (receiver). Alternatively, the communications interface may communicate with another device by using the element that has the transceiver function. The element that has the transceiver function may be implemented by an antenna and/or a radio frequency apparatus.

The processor 710 and the memory 730 may be integrated into one processing apparatus. The processor 710 is configured to execute program code stored in the memory 730 to implement the foregoing functions. During specific implementation, the memory 730 may alternatively be integrated into the processor 710, or may be independent of the processor 710.

The network device may further include an antenna 740, configured to send, by using a radio signal, downlink data or downlink control signaling output by the transceiver 720.

Specifically, the network device 700 may correspond to the network device in the method 200 for generating HARQ information according to the embodiments of this application. The network device 700 may include modules configured to perform the method performed by the network device in the method 200 of FIG. 10. In addition, the modules in the network device 700 and the foregoing other operations and/or functions are separately used to implement corresponding procedures in the method 200 of FIG. 10. Specifically, the memory 730 is configured to store the program code, so that when executing the program code, the processor 710 controls the transceiver 720 to perform step 210 in the method 200 by using the antenna 740. A specific process in which each module performs the foregoing corresponding step is described in detail in the method 200. For brevity, details are not described herein again.

It should be understood that, the processor in the embodiments of this application may be a central processing unit (central processing unit, CPU), or the processor may be another general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or a transistor logic device, a discrete hardware component, or the like. The general-purpose processor may be a microprocessor, or the processor may be any conventional processor or the like.

It may be further understood that the memory in the embodiments of this application may be a volatile memory or a non-volatile memory, or may include both a volatile memory and a non-volatile memory. The non-volatile memory may be a read-only memory (read-only memory, ROM), a programmable read-only memory (programmable ROM. PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through examples but not limitative descriptions, many forms of random access memories (random access memory, RAM) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

According to the method provided in the embodiments of this application, this application further provides a computer program product. The computer program product includes computer program code; and when the computer program code is run on a computer, the computer is enabled to perform the methods in the foregoing embodiments.

According to the method provided in the embodiments of this application, this application further provides a computer-readable medium. The computer-readable medium stores program code; and when the program code is run on a computer, the computer is enabled to perform the methods in the foregoing embodiments.

According to the method provided in the embodiments of this application, this application further provides a system, including the foregoing network device and one or more terminal devices. All or some of the foregoing embodiments may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are completely or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located at one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for generating hybrid automatic repeat request HARQ information, comprising:
    receiving, by a terminal device, a first message sent by a network device, wherein the first message indicates that there are M bandwidth part (BWP) groups in a cell, the first message indicates a plurality of identifiers (IDs) corresponding to the M BWP groups, the M BWP groups comprise N BWPs, each BWP group of the M BWP groups comprises an active BWP, M and N are integers greater than or equal to 2, and M≤N; and
    generating, by the terminal device, hybrid automatic repeat request (HARQ) information based on the first message, wherein the generating, by the terminal device, HARQ information based on the first message comprises:
    determining, by the terminal device based on an ID of one BWP group in the M BWP groups, a physical downlink shared channel (PDSCH) receiving occasion set corresponding to an active BWP in the one BWP group; and
    generating, by the terminal device, second HARQ information based on the PDSCH receiving occasion set corresponding to the active BWP in the one BWP group.

2. The method according to claim 1, wherein the method further comprises:
    receiving, by the terminal device, a second message sent by the network device, wherein the second message indicates at least one of the following: a quantity of codewords (CWs) of the active BWP in the one BWP group, a quantity of code block groups (CBGs) of the active BWP in the one BWP group, or HARQ information spatial bundling indication information; and
    determining, by the terminal device, a quantity of bits of the second HARQ information based on the second message.

3. The method according to claim 2, wherein the determining, by the terminal device, a quantity of bits of the second HARQ information based on the second message comprises:
    determining, by the terminal device, the quantity of bits of the second HARQ information based on a maximum value of the quantity of the CWs or a maximum value of the quantity of the CBGs.

4. A method for generating hybrid automatic repeat request HARQ information, comprising:
    sending, by a network device, a first message to a terminal device, wherein the first message indicates that there are M bandwidth part (BWP) groups in a cell, the first message indicates a plurality of identifiers (IDs) corresponding to the M BWP groups, the M BWP groups comprise N BWPs, each BWP group of the M BWP groups comprises an active BWP, M and N are integers greater than or equal to 2, and M≤N; and
    receiving, by the network device, hybrid automatic repeat request (HARQ) information sent by the terminal device, wherein the receiving, by the network device, HARQ information sent by the terminal device comprises:
    receiving, by the network device, second HARQ information sent by the terminal device, wherein the second HARQ information is generated by the terminal device based on a physical downlink shared channel (PDSCH) receiving occasion set corresponding to an active BWP in one BWP group in the M BWP groups, the PDSCH receiving occasion set corresponding to the active BWP in the one BWP group is determined by the terminal device based on the ID of the one BWP group.

5. The method according to claim 4, wherein the method further comprises:
    sending, by the network device, a second message to the terminal device, wherein the second message indicates at least one of the following: a quantity of codewords (CWs) of the active BWP in the one BWP group, a quantity of code block groups (CBGs) of the active BWP in the one BWP group, or HARQ information spatial bundling indication information.

6. The method according to claim 5, wherein
    a quantity of bits of the second HARQ information is determined by the terminal device based on a maximum value of the quantity of the CWs or a maximum value of the quantity of the CBGs.

7. An apparatus comprising:
    at least one processor; and
    one or more memories coupled to the at least one processor and storing programming instructions for execution by the at least one processor, the programming instructions instruct the at least one processor to:

receive a first message sent by a network device, wherein the first message indicates that there are M active bandwidth part (BWP) groups in a cell, the first message indicates a plurality of identifiers (IDs) corresponding to the M BWP groups, the M BWP groups comprise N BWPs, each BWP group of the M BWP groups comprises an active BWP, M and N are integers greater than or equal to 2, and M≤N; and generate hybrid automatic repeat request (HARQ) information based on the first message, wherein the generate HARQ information based on the first message comprises:

determine, based on an ID of one BWP group in the M BWP groups, a physical downlink shared channel (PDSCH) receiving occasion set corresponding to an active BWP in the one BWP group; and generate second HARQ information based on the PDSCH receiving occasion set corresponding to the active BWP in the one BWP group.

8. The apparatus according to claim 7, wherein the programming instructions further instruct the at least one processor to:

receive a second message sent by the network device, wherein the second message indicates at least one of the following: a quantity of codewords (CWs) of the active BWP in the one BWP group, a quantity of code block groups (CBGs) of the active BWP in the one BWP group, or HARQ information spatial bundling indication information; and determine a quantity of bits of the second HARQ information based on the second message.

9. The apparatus according to claim 8, wherein the programming instructions further instruct the at least one processor to determine the quantity of bits of the second HARQ information based on a maximum value of the quantity of the CWs or a maximum value of the quantity of the CBGs.

10. An apparatus comprising:
at least one processor; and
one or more memories coupled to the at least one processor and storing programming instructions for execution by the at least one processor, the programming instructions instruct the at least one processor to:

send a first message to a terminal device, wherein the first message indicates that there are M bandwidth part (BWP) groups in a cell, the first message indicates a plurality of identifiers (IDs) corresponding to the M BWP groups, the M BWP groups comprise N BWPs, each BWP group of the M BWP groups comprises an active BWP, M and N are integers greater than or equal to 2, and M≤N; and receive hybrid automatic repeat request (HARQ) information sent by the terminal device, wherein the receive HARQ information sent by the terminal device comprises:

receive second HARQ information sent by the terminal device, wherein the second HARQ information is generated by the terminal device based on a physical downlink shared channel (PDSCH) receiving occasion set corresponding to an active BWP in one BWP group in the M BWP groups, the PDSCH receiving occasion set corresponding to the active BWP in the one BWP group is determined by the terminal device based on the ID of the one BWP group.

11. The apparatus according to claim 10, wherein the programming instructions further instruct the at least one processor to:

send a second message to the terminal device, wherein the second message indicates at least one of the following: a quantity of codewords (CWs) of the active BWP in the one BWP group, a quantity of code block groups (CBGs) of the active BWP in the one BWP group, or HARQ information spatial bundling indication information.

12. The apparatus according to claim 11, wherein
a quantity of bits of the second HARQ information is determined by the terminal device based on a maximum value of the quantity of the CWs or a maximum value of the quantity of the CBGs.

* * * * *